(12) United States Patent
O'Connell

(10) Patent No.: US 9,088,691 B2
(45) Date of Patent: *Jul. 21, 2015

(54) LIVE TELEPORTING SYSTEM AND APPARATUS

(71) Applicant: Musion IP Ltd., London (GB)

(72) Inventor: Ian Christopher O'Connell, London (GB)

(73) Assignee: Musion IP Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/899,672

(22) Filed: May 22, 2013

(65) Prior Publication Data

US 2013/0335505 A1  Dec. 19, 2013

Related U.S. Application Data

(63) Continuation of application No. 13/054,407, filed as application No. PCT/GB2009/050850 on Jul. 14, 2009, now Pat. No. 8,462,192.

(60) Provisional application No. 61/080,411, filed on Jul. 14, 2008.

(51) Int. Cl.
*H04N 7/14* (2006.01)
*H04N 7/15* (2006.01)
(Continued)

(52) U.S. Cl.
CPC ............... *H04N 7/15* (2013.01); *G03B 15/02* (2013.01); *H04N 5/2224* (2013.01); *H04N 5/272* (2013.01); *H04N 7/142* (2013.01); *H04N 19/112* (2014.11); *H04N 19/132* (2014.11); *H04N 19/137* (2014.11); *H04N 19/17* (2014.11); *H04N 19/186* (2014.11); *H04N 19/20* (2014.11); *H04N 19/587* (2014.11)

(58) Field of Classification Search
None
See application file for complete search history.

(56) References Cited

U.S. PATENT DOCUMENTS 4,927,238 A * 5/1990 Green et al. .................. 359/466
5,255,028 A 10/1993 Biles
(Continued)

FOREIGN PATENT DOCUMENTS

GB  2321565 A  7/1998
JP  2001313849 A  11/2001

OTHER PUBLICATIONS

International search report and written opinion dated Apr. 9, 2010.
(Continued)

*Primary Examiner* — Maria El-Zoobi
(74) *Attorney, Agent, or Firm* — Waller Lansden Dortch & Davis, LLP; Larry W. Brantley, Esq.

(57) ABSTRACT

A telepresence system includes a projector for generating an image, a projection screen for reviewing the image generated by the projector and generating a reflected image and a foil for reviewing the reflected image generated by the projection screen. The foil generates and directs partially reflected image toward an audience, the partially reflected image being perceived by the audience as a virtual image or hologram located on a viewing stage. Additionally, the system incorporates a camera for filming an individual through the foil, the camera being located on a camera side of the foil and positioned adjacent to the viewing stage, the individual being located on an individual side of the foil and positioned on a filming stage.

8 Claims, 38 Drawing Sheets

(51) Int. Cl.
*G03B 15/02* (2006.01)
*H04N 5/222* (2006.01)
*H04N 5/272* (2006.01)
*H04N 19/112* (2014.01)
*H04N 19/132* (2014.01)
*H04N 19/137* (2014.01)
*H04N 19/186* (2014.01)
*H04N 19/17* (2014.01)
*H04N 19/20* (2014.01)
*H04N 19/587* (2014.01)

(56) References Cited

U.S. PATENT DOCUMENTS

| | | | |
|---|---|---|---|
| 5,573,325 A | 11/1996 | Lekowski | |
| 5,865,519 A | 2/1999 | Maas | |
| 5,890,787 A * | 4/1999 | McNelley et al. | 353/28 |
| 6,144,360 A | 11/2000 | Evanicky et al. | |
| 6,290,359 B1 | 9/2001 | Shriver | |
| 6,481,851 B1 | 11/2002 | McNelley et al. | |
| 6,981,782 B2 | 1/2006 | Kai et al. | |
| 7,136,090 B1 | 11/2006 | McDuffie White | |
| 7,668,371 B2 | 2/2010 | Dorai et al. | |
| 8,270,075 B2 * | 9/2012 | Howes et al. | 359/449 |
| 8,323,027 B2 | 12/2012 | George | |
| 8,734,260 B2 * | 5/2014 | Pececnik | 463/42 |
| 2003/0035917 A1 * | 2/2003 | Hyman | 428/67 |
| 2003/0174292 A1 | 9/2003 | White | |
| 2005/0237381 A1 | 10/2005 | White | |
| 2007/0201004 A1 | 8/2007 | O'Connell et al. | |
| 2008/0219554 A1 | 9/2008 | Dorai et al. | |
| 2009/0231414 A1 * | 9/2009 | Graham et al. | 348/14.08 |
| 2010/0253700 A1 * | 10/2010 | Bergeron | 345/633 |
| 2011/0149248 A1 * | 6/2011 | Ley et al. | 352/43 |
| 2012/0314284 A1 * | 12/2012 | Howes et al. | 359/443 |
| 2014/0094246 A1 * | 4/2014 | Pececnik | 463/19 |

OTHER PUBLICATIONS

International Preliminary Report on Patentability dated Oct. 21, 2010.

* cited by examiner

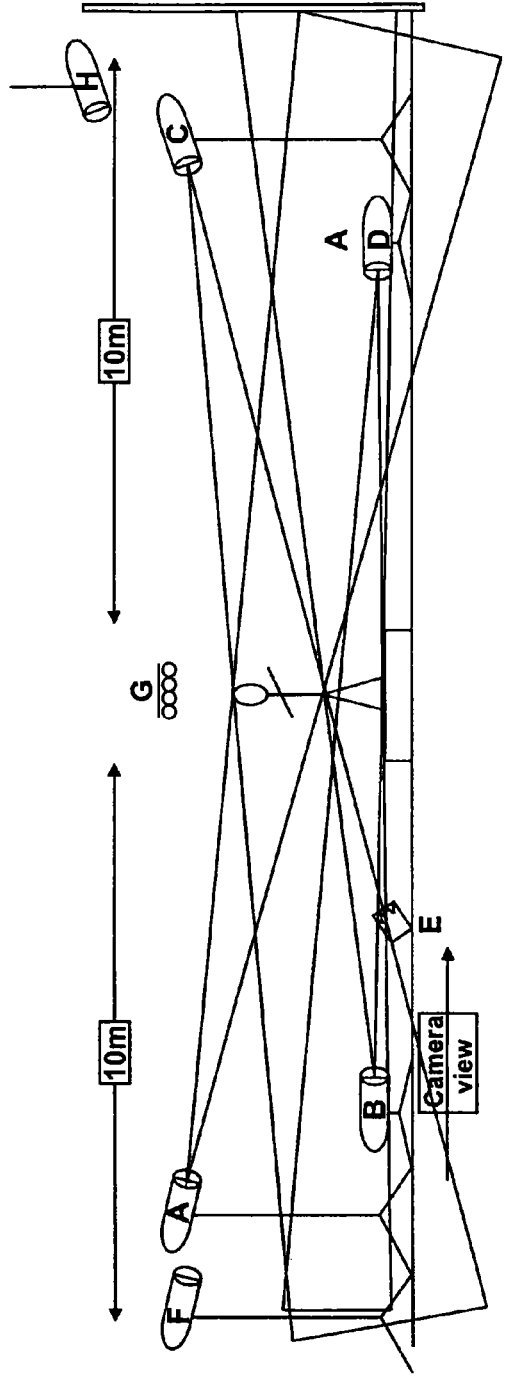

Key:

A - Highfront. Covers head to waist/shuttered off stage floor
B - Low/front. Covers waist to feet including shoes/shuttered off stage, so height of lamp must be height of stage
C - High/rim. Covers head to waist/shuttered off stage floor
D - Low/rim. Covers to feet including shoes/shuttered off stage, so height of lamp must be height of stage
E* - floor fill - lifts shadows in clothing
F* - eye light - hard focus slot + diff?
G† - overhead Kinos - lifts dark hair
H - High/rim. Centre backlight (head to waist) / shuttered off stage A - D, H: Focus with hard edge shutters, then slightly soften to mask cross-over lines. Use ND/dimmers to balance body/legs. Make sure shoes are fully covered.

*Fig. 35*

5x   ETC Source4 (50° or 25-50 zoom) ellipsoidal spots* on high (14ft) stands
4x   ETC Source4 (50° or 25-30 zoom) ellipsoidal spots* on lowboys/turtles (lens height to match height of studio staging)
1x   ETC Source4 (36° or 25-30 zoom) ellipsoidal spot* flown/hung as centre backlight

*alternatives accepted: any 750w HPL or 1kW/1.2kW tungsten profile/ellipsoidal spot with beam angles as specified*

2x   4 Bank 4ft KinoFlos (tungsten tubes) on goalpost over studio staging
2x   2kW Fresnels on regular stands each through 4' x 4' diffusion frame (F2 / 1/2 Diff)
2x   650w Fresnels on lowboys/turtles A selection of large and small flags and Charlie bars.
Stands, knuckles, etc for above Various black/white poly/foam core sheets and support ND0.3 and ND0.6 filter
Hampshire Frost, F1 / 1/4 Diff and F2 / 1/2 Diff filter 4-9 ways of 2kW dimming if available

*Fig. 37*

LIVE TELEPORTING SYSTEM AND APPARATUS

CROSS REFERENCE TO RELATED APPLICATION

This utility application is a continuation of U.S. patent application Ser. No. 13/054,407, filed on Mar. 15, 2011, (now allowed) that claims priority to "LIVE TELEPORTING SYSTEM AND APPARATUS," having serial number PCT/GB2009/050850, filed on Jul. 14, 2009, which claims priority to and the benefit of U.S. Provisional Application No. 61/080,411, filing date Jul. 14, 2008.

DESCRIPTION OF THE RELATED ART

The origins and performance of video telephony are well documented. In summary, the two-way interaction between two or more persons located remotely of one another is to a large degree dependent upon a communications link and equipment capable of facilitating the desired level of interaction.

The communications link may be a simple copper wire, a more substantial broadband fibre optic cable, satellite or even radio waves.

In its most basic form, video telephony equipment comprises a handset at each end of the connection, the handset being equipped with voice processing and amplification for dialogue, a camera and video screen to enable the participants to see one another. Video telephones are included, as are personal computers equipped with the necessary web cams, telephony software and Internet connections.

More recently, the technology of Telepresence has been developed and refined by companies such as Cisco and Teleris. Telepresence (TP) is defined as a system of real time communication enabling two or more people located remotely of one another to exchange a dialogue based on the principals of telephony ("Tele") enhanced by the immersive experience of lowest time latency for a) high quality life size head and shoulders motion imagery of participants by way of using large (typically HD standard) video display monitors and b) maintaining eye to eye contact between participants during conversation c) complimented by intelligently lip synched audio, ("Presence").

TP systems typically use the Internet communications cable infrastructure as the signal conduit. Satellite can be used but whereas Internet connections allow two way or multiple way conversations with video to experience signal latency of as little as 40 milliseconds (acceptable as an immersive experience) satellite signals render latency levels of 200 milliseconds or more, hence the experience for participants is one of perceptible signal delay. Radio waves offer low latency but the signal may be transmitted over only limited distances—typically up to just a few miles.

TP systems apparatus typically consist of video monitors to display images, audio equipment to record, amplify and broadcast voice/sound, cameras to capture the video images for display and codec enabling the sound and vision to be 'packaged up' (encrypted and compressed) in a format optimised for point to point transmission between at least two remote locations.

TP systems generally offer immersive experiences for between 2-18 people at one time. Generally one monitor is used to display head and shoulders of one person. However latterly, larger 65" monitors or bigger are used to display up to 3 different people sited in one location on a single screen. Monitors are grouped typically in a row array of 2, 3 or 4 units set along the wall of a conference room, facing a table as if the screens are 'sat' at the table.

The object of this invention is to provide a more realistic or immersive TP experience for use in larger and/or more public environments. This includes providing TP in bigger meeting rooms allowing more participants, TP for live stage environs (theatre, conference halls, museums, trade shows) and even in store and window front retail displays.

BRIEF DESCRIPTION OF THE DRAWINGS

FIGS. 4-38 are schematic diagrams depicting example embodiments.

DETAILED DESCRIPTION

This invention comprises a number of enhancements to the entire set of apparatus used in the TP process. Enhancements maybe used selectively or as a whole and thus the performance enhancements resulting maybe subtle or significant on a case by case basis.

Firstly, the use of a video panel screen for the display is the greatest limiting factor for achieving both scale and an immersive experience. The reason being that monitors offer limited realism in the visual effect whilst also consuming a greater amount of 'data bandwidth' to achieve their limited effect. Their limited realism comes about by way of their video displays appearing as flat 2D images. This is common and well known to any audience member familiar with watching conventional television screens.

TP vendors do attempt to mitigate the 2D effect by arranging the screens in rooms decorated in a uniform background to maximise the luminosity of the video subjects against their plain backdrop surroundings. Furthermore most recent TP systems use 50" High Definition (HD) video monitors, resulting in life size head and shoulders imagery that is crisp with superior contrast.

Each monitor requires a camera located at the remote site to feed a video signal for display and a microphone to record the sound or voice signal (together the Signal Feed or SF). Each SF in turn needs a certain amount of data space, or bandwidth, from the communications link in order to transmit the SF to the broadcast video monitor and sound system. The amount of data space required is in itself dependent upon two key factors—the data size of the signal in its 'unpackaged' (uncompressed) format and the way that SF is then 'packaged' or compressed. The packaging of data is achieved using a video and sound codec.

Figure 1:
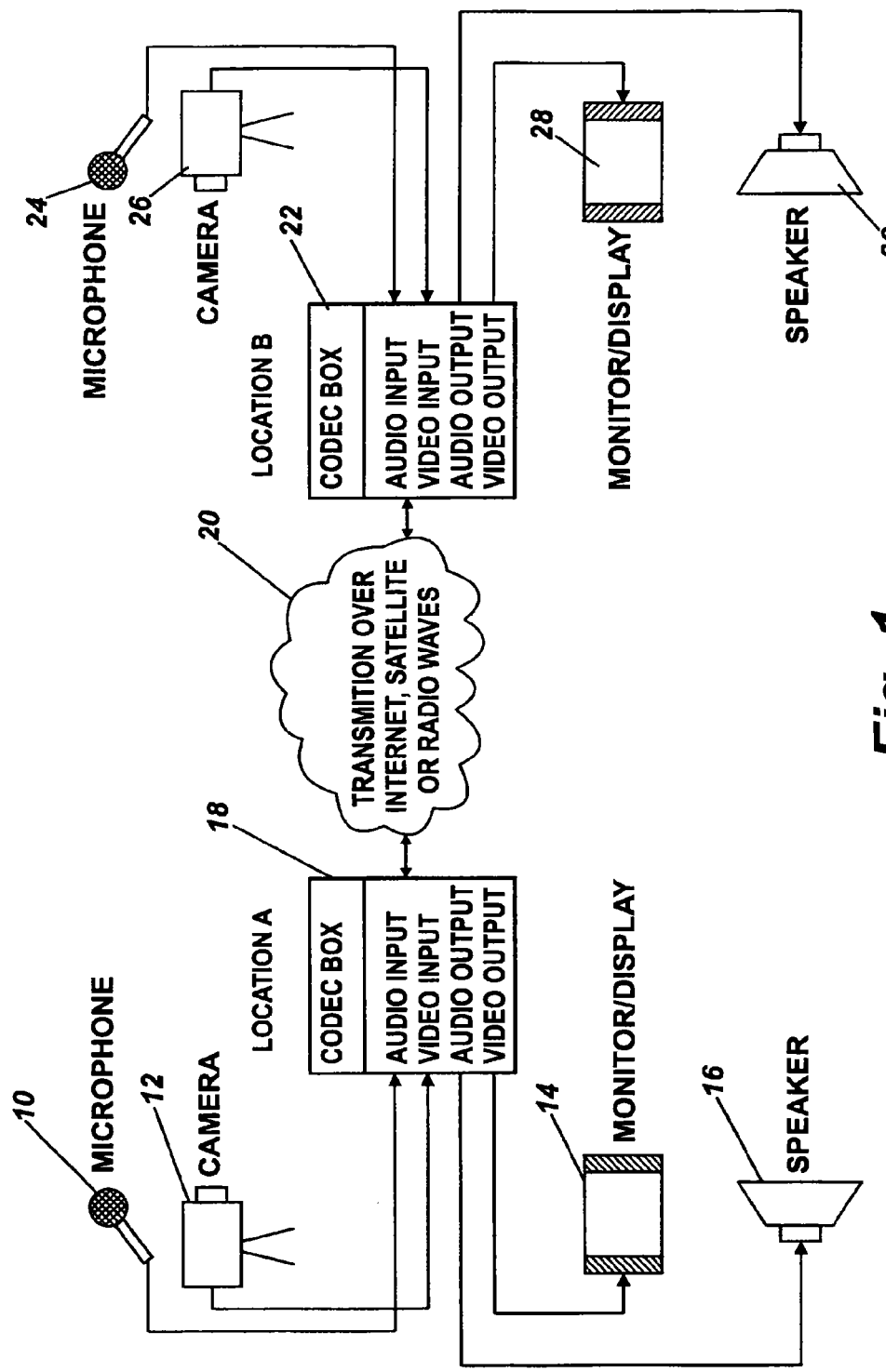
FIG. 1 is a schematic diagram depicting a codec and a broadcast stream of the prior art.

Codec accessories come in many forms. Generally a codec includes software for encryption and compression (together Encoding) of video and sound into a data packet which can then be transmitted over the Internet, satellite or radio waves. The codec is often incorporated into a box chassis, much like the casing of a typical small network computer chassis. Codec chassis can have a variable number of inputs and outputs allowing the processing of multiple data streams or SF, inwards (downloading) and outwards (uploading). See attached diagram FIG. 1 to understand how a codec sits in the broadcast stream and FIG. 2 to view internal working of a codec unit.

Codec are designed and configured to process particular kinds of audio and video streams. This invention relates in the main to the most common video streams of Broadcast Pal or NTSC (BP NTSC), High Definition signals of 720 horizontal lines progressive (720P), 1920 vertical lines.times.1080 horizontal lines progressive (1080P) and 1920 vertical lines.times.1080 horizontal lines interlaced (1080i). Other video standards such as 2K and 4K resolutions could also benefit from the teachings here but we shall concern our solutions to be capable of solving the issues using video standards that are in widespread use currently.

In video, a field is one of the many still images which are displayed sequentially to create the impression of motion on the screen. Two fields comprise one video frame. When the fields are displayed on a video monitor they are "interlaced" so that the content of one field will be used on all of the odd-numbered lines on the screen and the other field will be displayed on the even lines. Converting fields to a still frame image requires a process called deinterlacing, in which the missing lines are duplicated or interpolated to recreate the information that would have been contained in the discarded field. Since each field contains only half of the information of a full frame, however, deinterlaced images do not have the resolution of a full frame.

In order to increase the resolution of video images, therefore, new schemes have been created that capture full-frame images for each frame. Video composed of such frames is called progressive scan video.

Progressive or noninterlaced scanning is a method for displaying, storing or transmitting moving images in which all the lines of each frame are drawn in sequence. This is in contrast to the interlacing used in traditional television systems where only the odd lines, then the even lines of each frame (each image now called a field) are drawn alternatively.

The system was originally known as "sequential scanning" when it was used in the Baird 240 line television transmissions from Alexandra Palace, England in 1936. It was also used in Baird's experimental transmissions using 30 lines in the 1920s. (The system may also be called 240p25 and 30p25).

Figure 3:
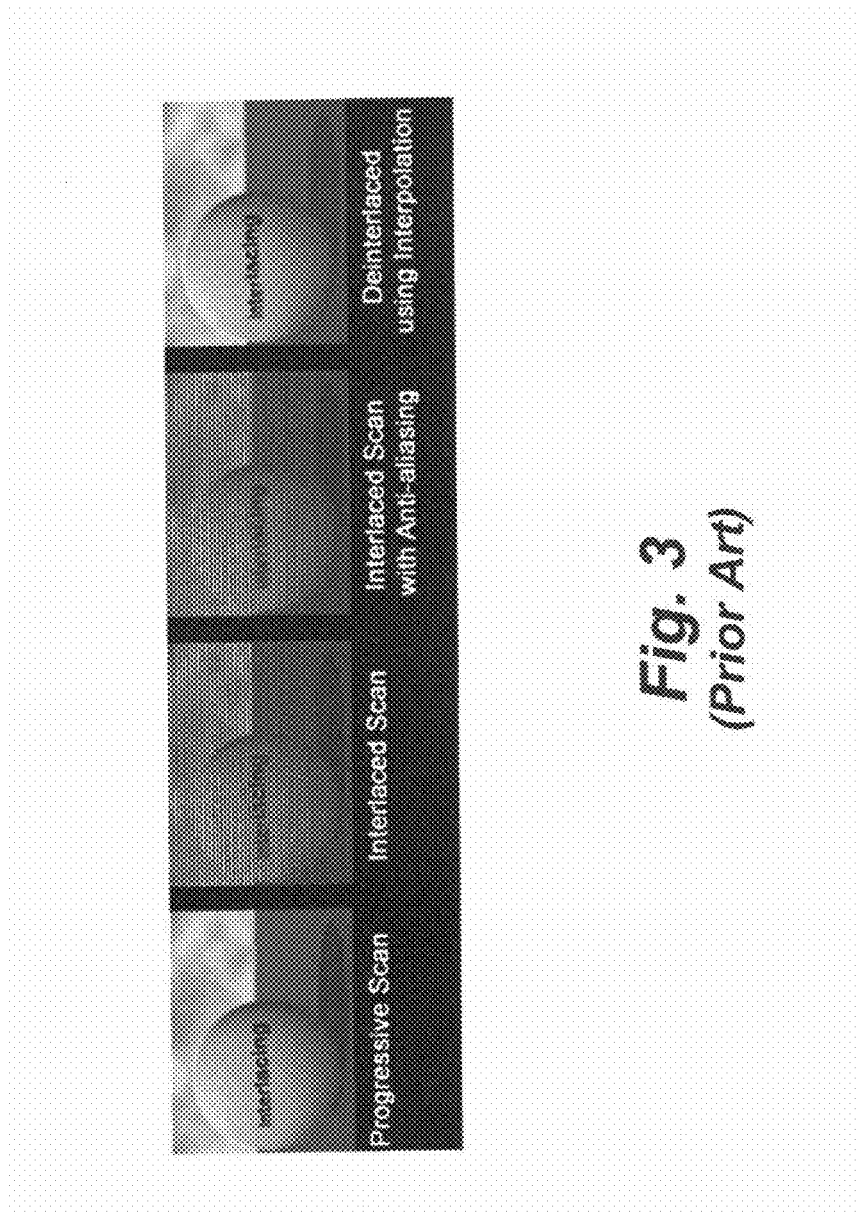
FIG. 3 is an illustration comparing various scan techniques of the prior art.

This illustration of FIG. 3 compares progressive scan (480p) with interlace scan (480i), also demonstrating the interline twitter effect associated with interlace. The interlaced images use half the bandwidth of the progressive ones. The left-center image precisely duplicates the pixels of the progressive one, but interlace causes details to twitter. Real interlaced video blurs such details to prevent twitter, but as seen on the right-center image, such softening (or anti-aliasing) comes at the cost of image clarity. A line doubler could not restore the previously interlaced image on the right to the full quality of the progressive image on the left.

1080p 1080p is sometimes referred to in marketing materials as "Complete High-Definition". However, 2K/4K digital cinema technology is commercially available, and ultra-high definition video is in the research phase.

Broadcasting Standards

ATSC and DVB support 1080p video, but only at the frame rates of 24, 25, and 30 frames per second (1080p24, 1080p25, 1080p30) and their 1000/1001-rate slow versions (e.g., 29.97 frames per second instead of 30). Higher frame rates, such as 1080p50 and 1080p60, could only be sent with more bandwidth or if a more advanced codec (such as H.264/MPEG-4 AVC) were used. Higher frame rates such as 1080p50 and 1080p60 are foreseen as the future broadcasting standard for production.

A new high-definition progressive scan format is not available for picture creation, but is currently being developed to operate at 1080p at 50 or 60 frames per second. This format will require a whole new range of studio equipment including cameras, storage, edit and contribution links as it has doubled the data rate of current 50 or 60 fields interlaced 1920.times.1080 from 1.485 Gbits/sec to nominally 3 Gbits/sec.

Image Change Rate

There are several agreed standard image change rates (or frame rates) in use today: 24 Hz, 25 Hz, 30 Hz, 50 Hz, and 60 Hz. Technical details related to the backwards-compatible addition of colour to the NTSC signal caused other variants to appear: 24/1.001 Hz, 30/1.001 Hz, 60/1.001 Hz.

The image change rate fundamentally affects how "fluid" the motion it captures will look on the screen. Moving image material, based on this, is sometimes roughly divided into 2 groups: the so called film-based material, where the image of the scene is captured by camera 24 times a second (24 Hz), and the video-based material, where the image is captured 50 or ~60 times a second.

The 50 and ~60 Hz material captures motion very well, and it looks very fluid on the screen. The 24 Hz material, in principle, captures motion satisfactorily, however because it is usually displayed at least at twice the capture rate in cinema and on CRT TV (to avoid flicker), it is not considered to be capable of transmitting "fluid" motion. It is nevertheless continued to be used for filming movies due to the unique artistic impression arising exactly from the slow image change rate.

Codec works by taking a video signal that, for example, from a 1080i camera filming at 50 frames per second via an HD SDI connection SMPTE 292m (Society of Motion Picture Technicians and Engineers recognised video standard) is typically 1 485 megabits (m/bits or MB) of data per second and compressing that signal sufficiently to allow transmission along a broadband Internet line.

Internet lines in themselves are of varying capacity. Typical consumer lines are 2-8 megabit speeds. Business lines vary from consumer type speeds, to E3 (34 m/bits), DS3 (45 m/bits) 155 m/bits and beyond. However the speeds are not constant, rather are a maximum.

By way of comparison conventional road standards offer a good analogy. A highway with a speed limit of 70 miles per hour may well indeed allow speeds of 70 MPH to be maintained when traffic on that highway is light. However a number of factors, not least of which a heavy traffic load, conspire to render achievable speeds averaging far less.

The caveat in using this road analogy is that whereas one can set a higher average speed for a road journey by arbitrarily exceeding speed limits in light traffic to compensate for slower speeds where interruptions occur, on the data highway no such compensatory factors usually apply. The speed of the line is the maximum speed of the line and thus if data interruptions do occur (which are inevitable on a public Internet connection) the signal is affected irrevocably.

Moreover, when one undertakes a road journey one does not necessarily have 70 MPH highway from destination to destination. Rather there are smaller roads with slower speeds. So it is with the public Internet highway. A fast 10 MB public line may bottleneck at some point before reaching its destination, thus again affecting the signal which, in TP applications, manifests itself as a sound/video/picture drop out—i.e. a temporary blank screen or a blast of missing words—unacceptable for a realistic immersive interactive experience.

Current TP solutions are for codec to compress SF as small as practical and for cable networks to be managed so they run as consistently fast as commercially viable bandwidth allows.

The result is that for codec, generally a raw BP NTSC signal compresses from around 550 m/bits to 1.5-2 m/bits per second, 720P to between 2-3 m/bits per second and 1080 signals to between 4 and 8 m/bits per second. TP networks are typically 10 MB for carrying up to 4 SF of either BP NTSC or 720P systems, E3 standard if more screens or 1080 signals are used and DS3 lines in circumstances where there are more than 4 screens requiring 1080 streams.

Signal consistency through the cable is provided by way of a managed or Virtual Private Network (VPN). This means that the SF data flow (upload and download) requires a dedicated line capable of guaranteeing the necessary minimum m/bits transmission speed consistently. For this TP users must pay a financial premium to have either a network built for their exclusive use (a Private Virtual network) wherein a technical manager be usually employed by that user.

Once the SF has been delivered to its broadcast destination another codec decompresses the SF at the point just before broadcast to the video monitor and sound system.

The effect of codec compressing signals to a fraction of their raw data rate during transmission is that certain elements of the original data's integrity is lost or in some way degraded. Compression of an HD signal typically causes dilution of image colour saturation, reduced contrast as well inducing motion blur around the entire body down to apparent loss of lens focus on details such as eye sockets, or where the video image has high contrast.

Conventional TP systems are not adversely affected by the compromises to video quality since it is a design fundamental to seat participants around a conference table using 50" monitors for broadcast—a setting suited to minimal subject movement and colour/contrast variations restricted to head and shoulders only against a uniformly decorated background.

A TP system optimised for broadcasting images over areas of 24M2 of more requires a different approach to all the elements of apparatus performance or use.

Firstly, the use of monitors maybe suitable for conference room applications. However video signals to 50" plasma monitors are not suitable for displaying life size human images. One solution is to use latest generation HD 103" monitors. If arranged vertically these monitors could display full size figures from a single SF. However, the image still suffers from the limitations inherent to using monitors would look flat and be incapable of any lateral movement on account of the limited screen width of just 24". Large monitors are also currently very costly. Moreover if a conference required multiple figures to address a watching audience then a monitor would be needed for each figure, requiring further expense of multiple monitors as well as more codec, greater Internet bandwidth and potentially higher IT costs overall.

A more practical solution would be to use a semi transparent foil screen secured under tension within a frame to form a smooth, flat surface, configured with a reflective front or rear projection screen and amplified light source to display video images in a 'peppers ghost' arrangement. This arrangement provides a number of well documented advantages in the field of video presentations upon a stage. When combined with TP, the use of a foil and projection adds a further significant advantage.

Peppers ghost images of 'virtual' human beings are becoming ever more realistic with advances in foil screen manufacture and installation processes allowing reflective polymer foil material as thin as 11 microns to form large screens with surface areas typically up to 36 m wide×8.1 m high characterised by surfaces that are smooth and free from surface deformities such as creases or wrinkles. The result is a screen that when used as part of an illuminated stage apparatus is all but invisible to the viewing audience yet is capable of 'bouncing' (reflecting) imagery (solid or video) onto the stage that is virtually indistinguishable from the image of the original.

The advances in foil preparation are further complimented by developments in film capture (cameras, lighting and set design) and better broadcast technology (projectors' resolution and brightness). Companies like Musion Systems have refined the art of 'virtual' imagery so that video projected onto a stage using a foil is virtually indistinguishable from the original in terms of visual likeness. Musion's technique relies upon a number of production and apparatus processes including optimising the projection throw of the projection lens according to the distance the viewing audience are from the projected image.

Using a foil, a typical HD projector of 10 000 lumens brightness and 1920×1080 pixels can project realistic images of virtual human beings or other objects up to 5 m wide, provided the optimal viewing distance of the audience viewing is at least 5 m distance away. Should the viewing audience be less, the throw of the projector would be shorter (or a narrower throw lens used), rendering the pixel count tighter and the image would be correspondingly shrunk—ideally to the optimal 3 m width for 3 m viewing distance.

Pixel size for the width of 5 m for a 1920×1080 image of projected pixels is significantly greater than the 1 m width or so a plasma screen offers for its 1920 pixels. The result is that for a single SF, a user deploying a 16×9 HD projector can utilise a viewing area of 5 m width×2.8 m height—sufficient to be viewable upon a stage area typical of conferences, trade shows and other live audience displays.

Furthermore if the projector is arranged within a 6 m×4 m foil screen based peppers ghost apparatus as disclosed in Maass U.S. Pat. No. 5,865,519, not only are the realistic looking SF video images broadcast with the means of video the sources for which are invisible to the audience, but live presenters may interact with these virtual figures and imagery on the same stage, or in the same field area. These embodiments add considerably to the realism or immersive experience of TP.

However, monitors aside, TP systems designed for board rooms do compromise the realistic effect by causing displaying motion blur when virtual figures undertake any left/right movement. Current TP codec systems shrink an HD SF from 1.5 gigabits/per second to just 5 or 6 megabits/per second. Non TP codec systems compress a signal less. Codec used in sports broadcast (where higher speed motion is more commonplace) compresses a signal to between 20-30 megabits/per second. However the trade off is that such large signals used in TP would result in greater levels of signal latency of the SF thus rendering the realism of immediate low latency interaction between SF and audience or live stage talent. Moreover, the need for 30 mega/bits for a single SF would require significantly higher available network bandwidth.

One solution would be to limit the movement of SF. This would not be practical if the SF is an entertainment artist or presenter whose performance relies on expressive movement. A compromise would be to use a variable bit rate codec capable of being switched from low bit rate in circumstances where low latency response times for SF/live interaction is crucial (such as Q&A sessions) and higher bit rate when motion video quality is important and actual SF interaction is not required (during an actual performance or presentation). In the latter element, bandwidth otherwise assigned to the interactive elements of the show (audience camera/s, positional reference camera/s) could be switched temporarily whilst not in use, concentrating all the available bandwidth instead on delivering the most realistic image experience.

This is most conveniently achieved using a switchable scalar (Spyder or Encore) along with the associated equipment. At the press of a controller button (managed either by presenter, artist or other designated show controllers) at appropriate moments during a presentation or performance. The control button is linked to a network router managing the codec download/upload data feeds (SF).

Figure 4:
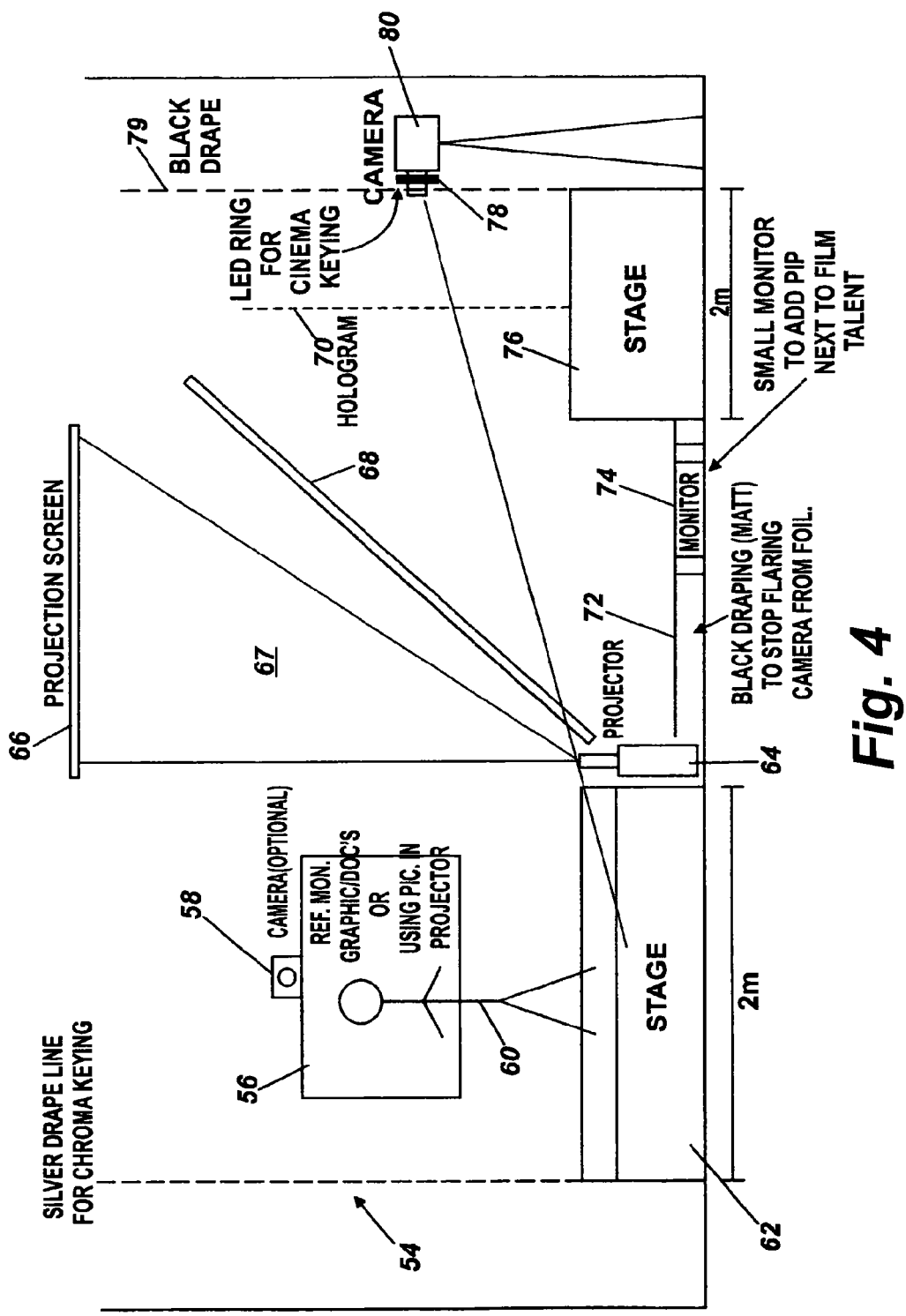
Figure 5:
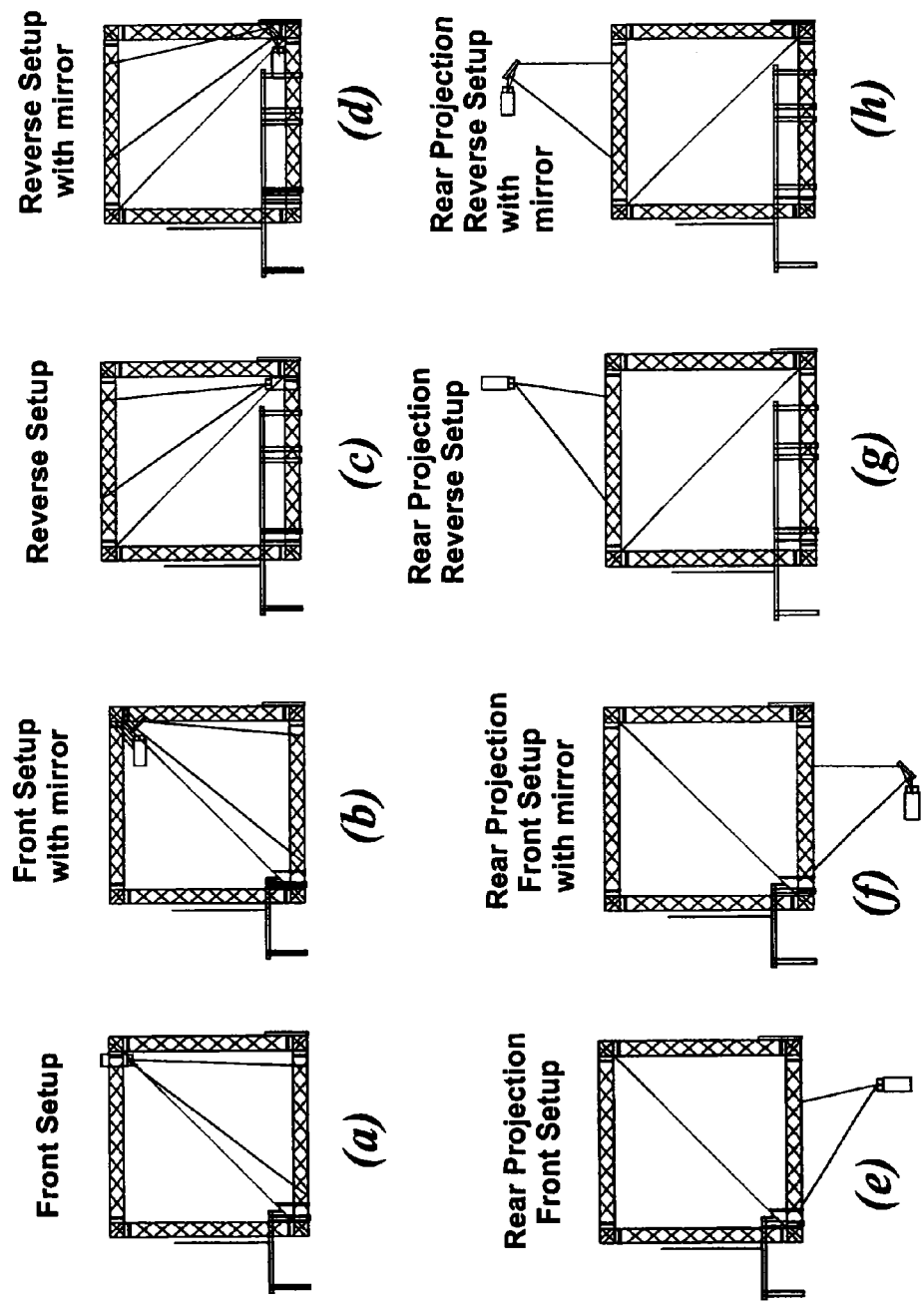
Figure 6:
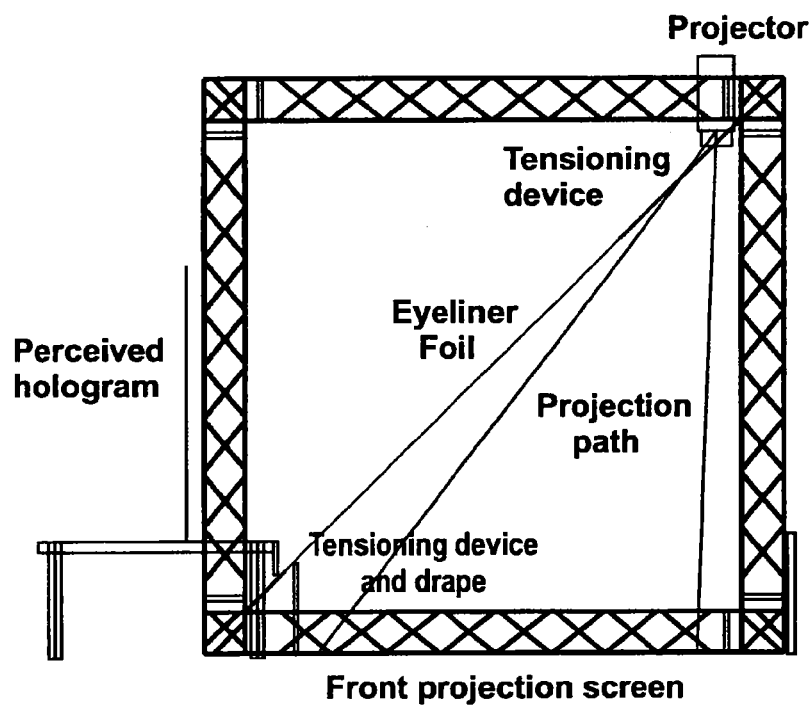
Figure 7:
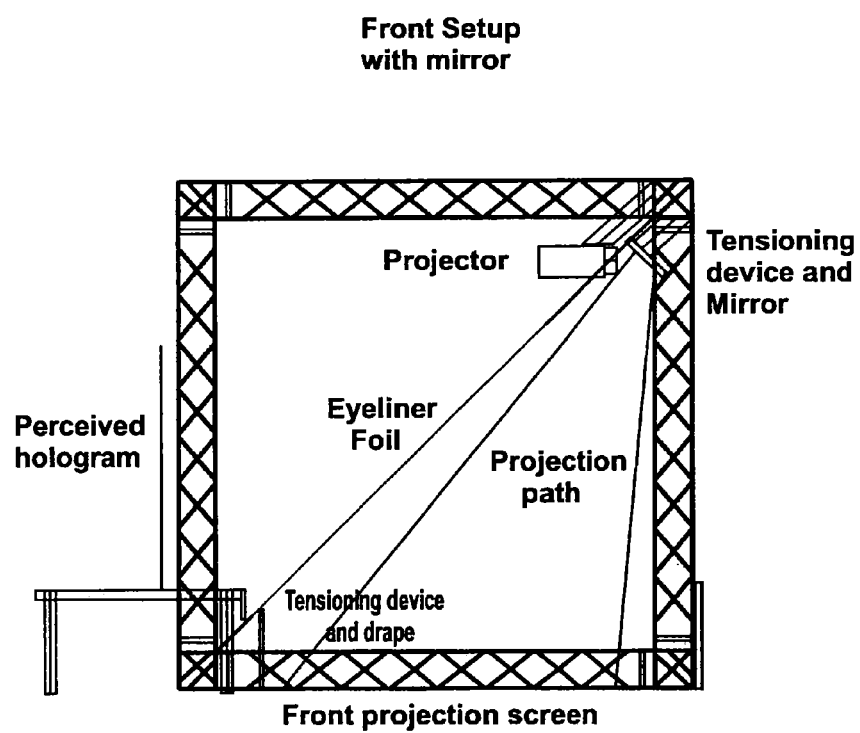
Figure 8:
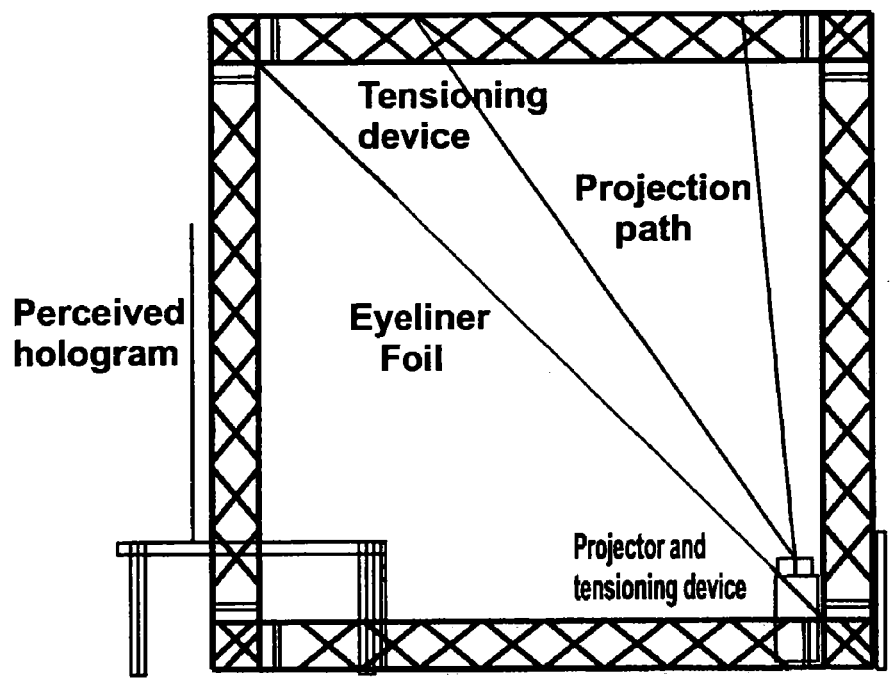
Figure 9:
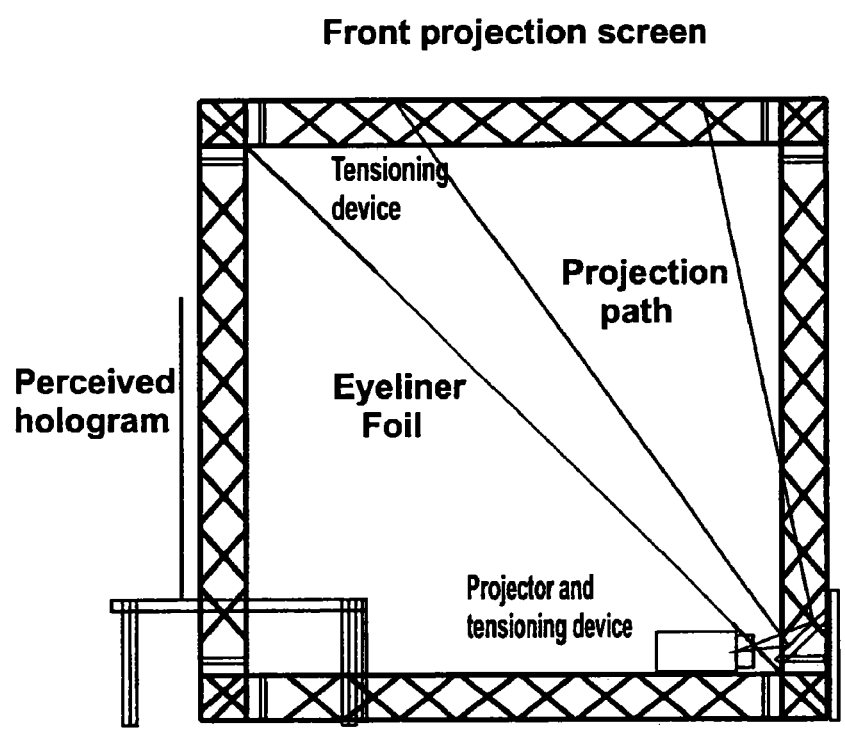
Figure 10:
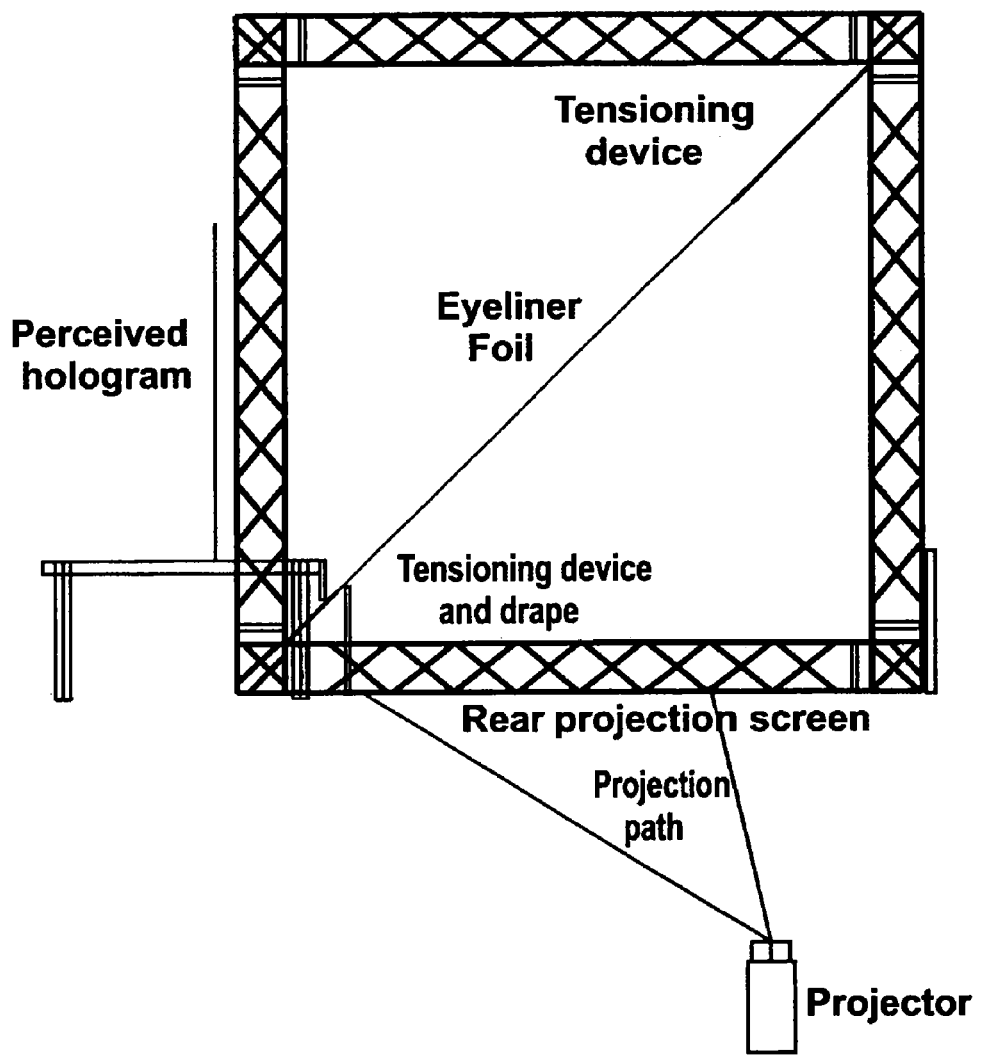
Figure 11:
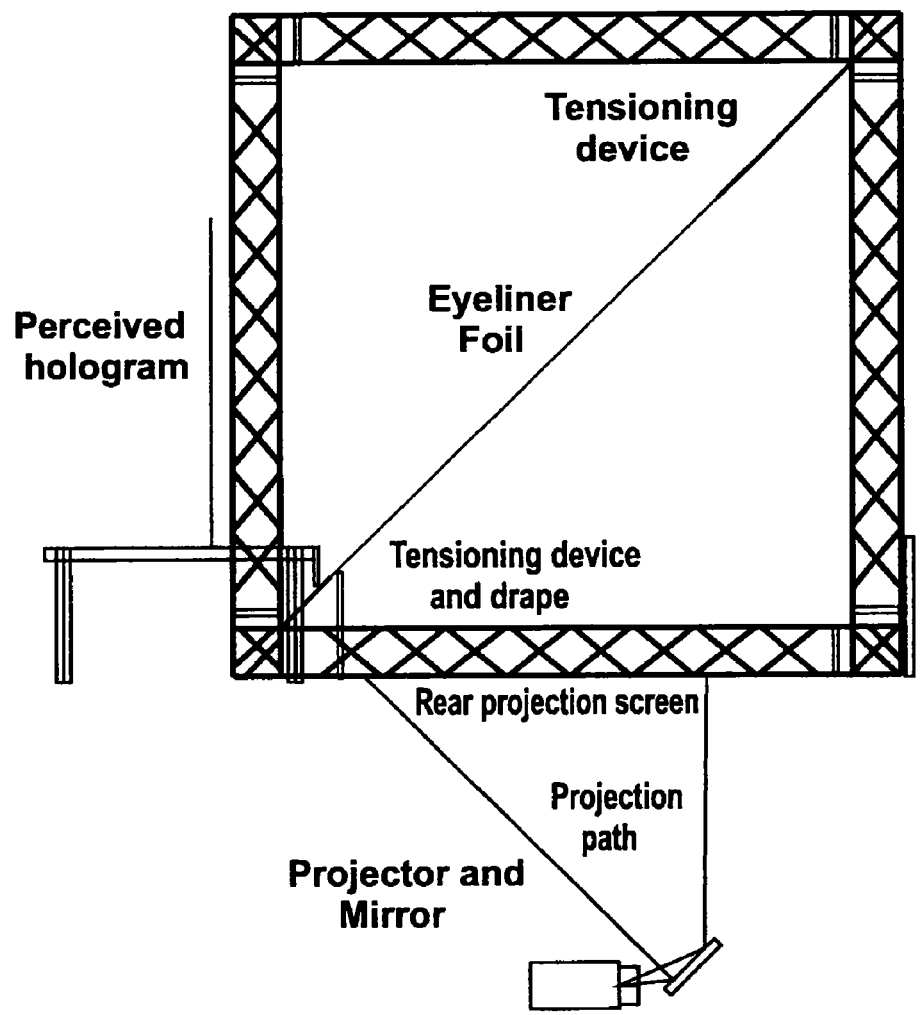
Figure 12:
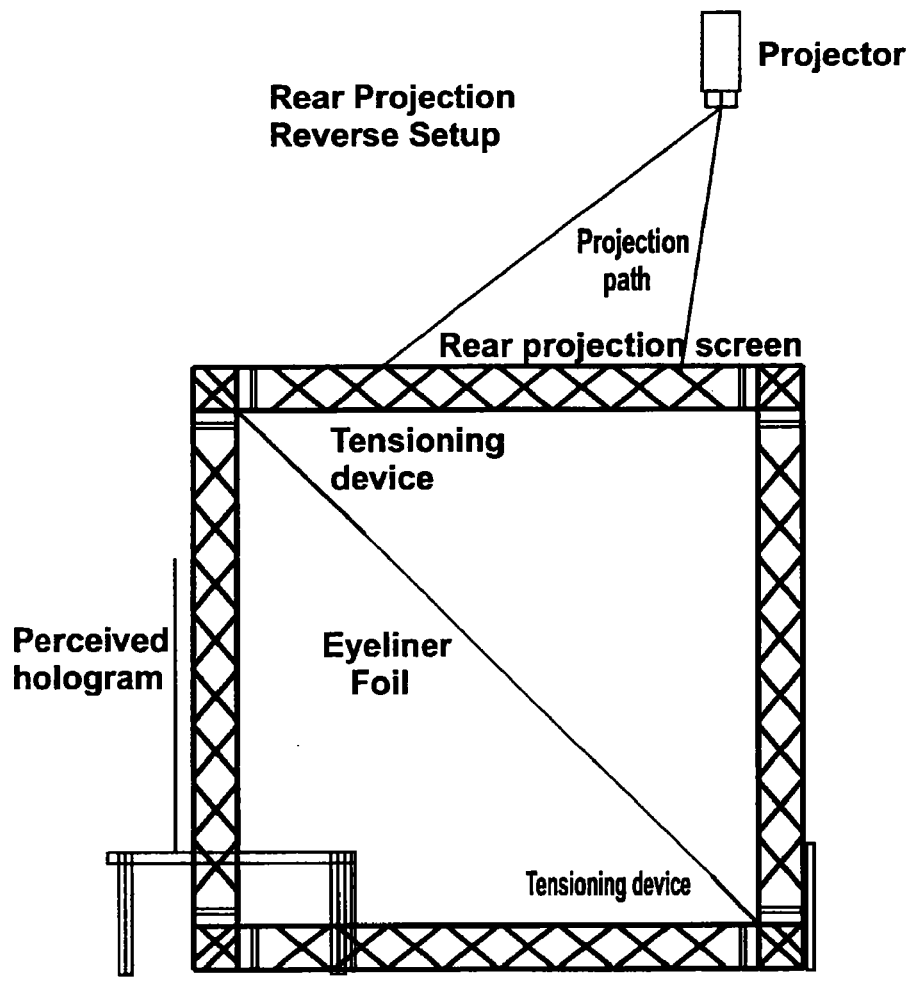
Figure 13:
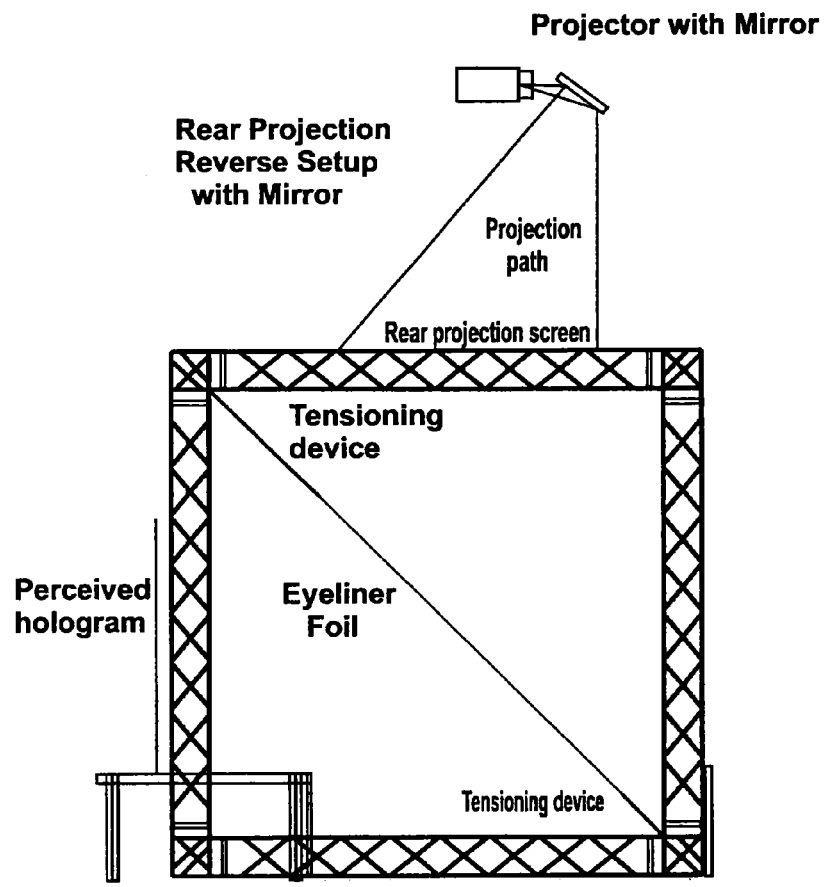
Figure 14:
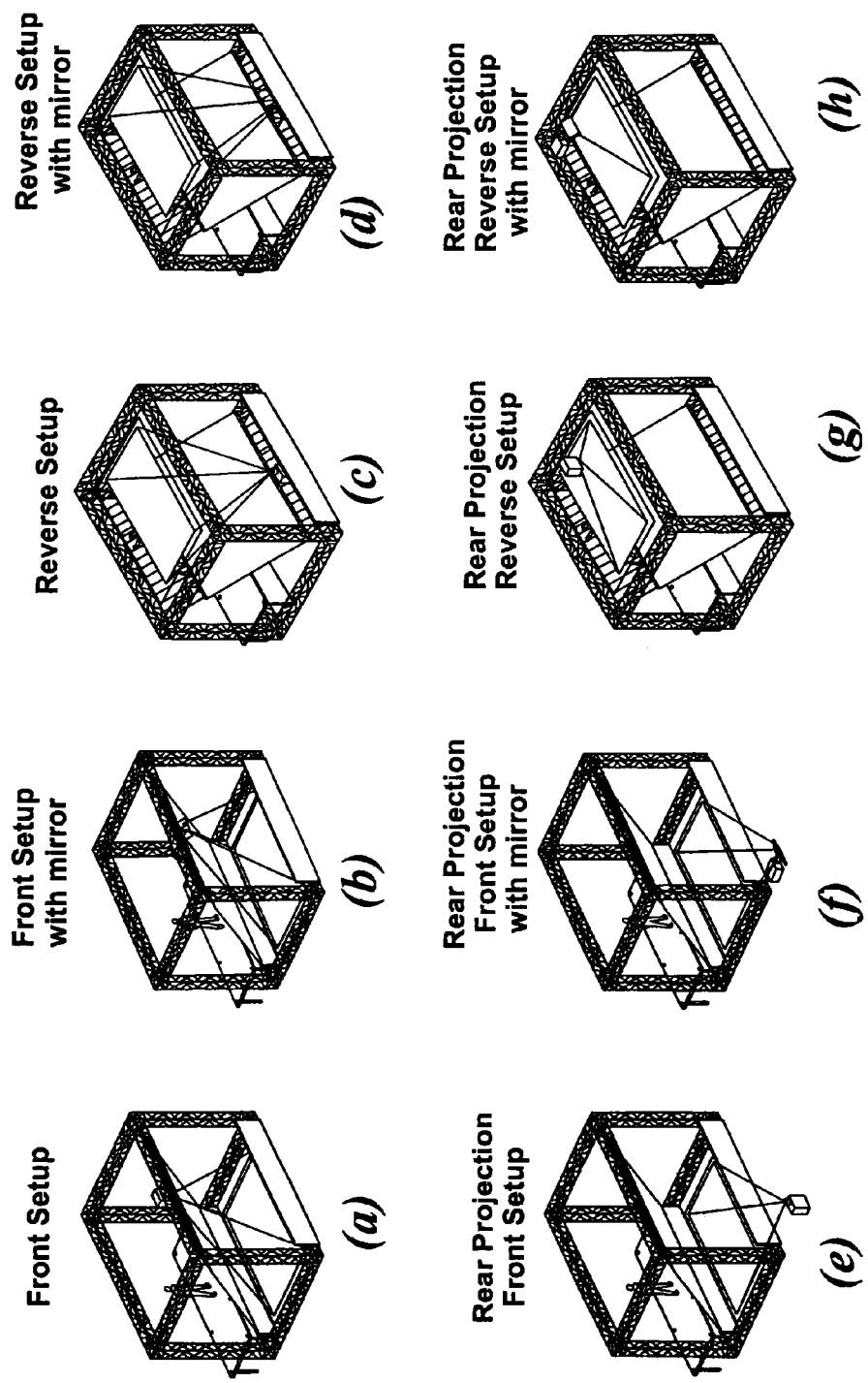
Figure 15:
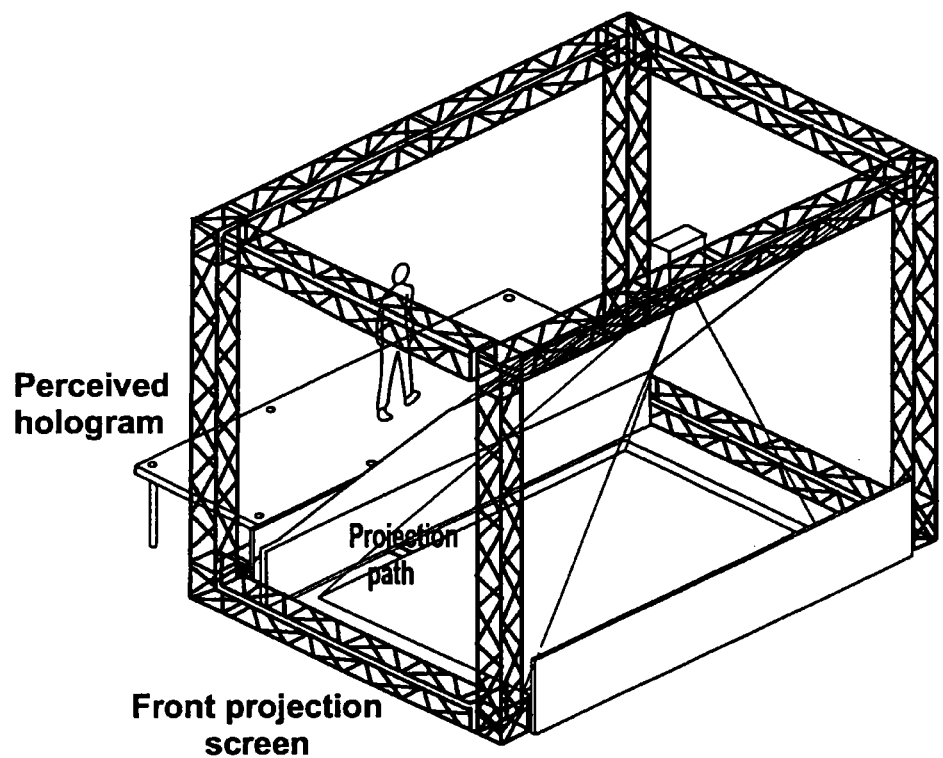
Figure 16:
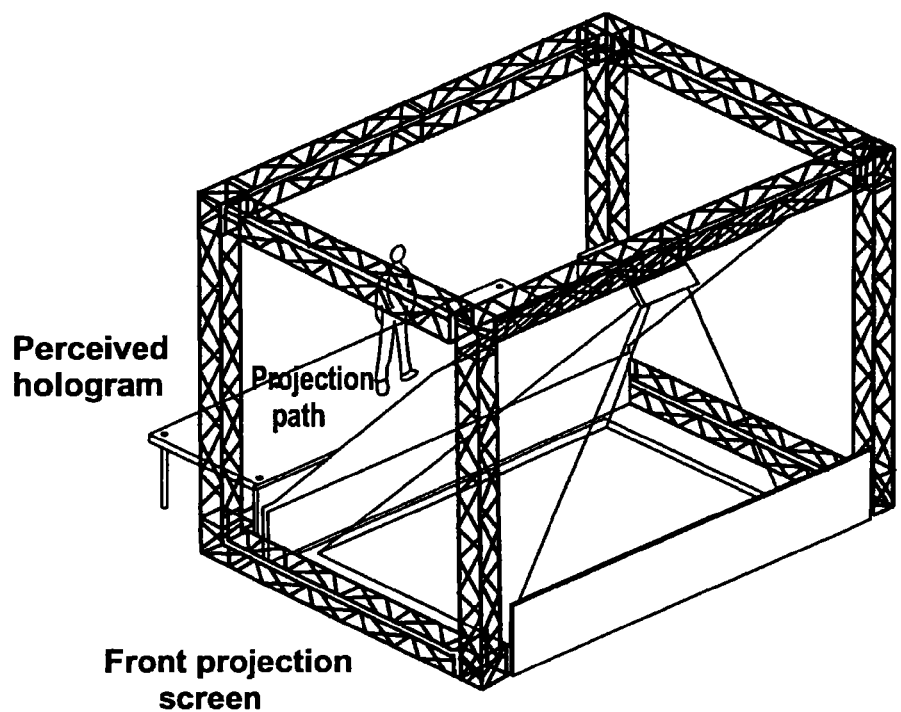
Figure 17:
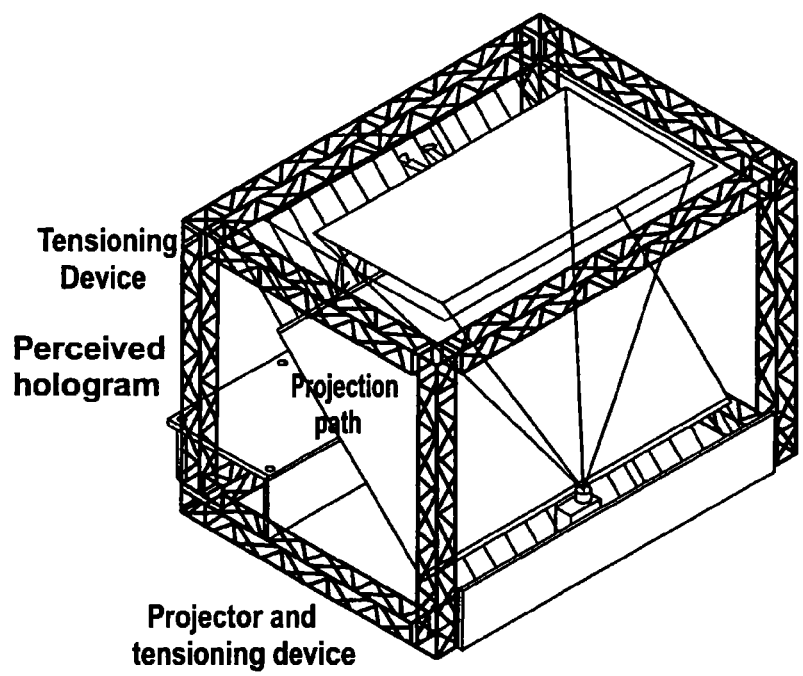
Figure 18:
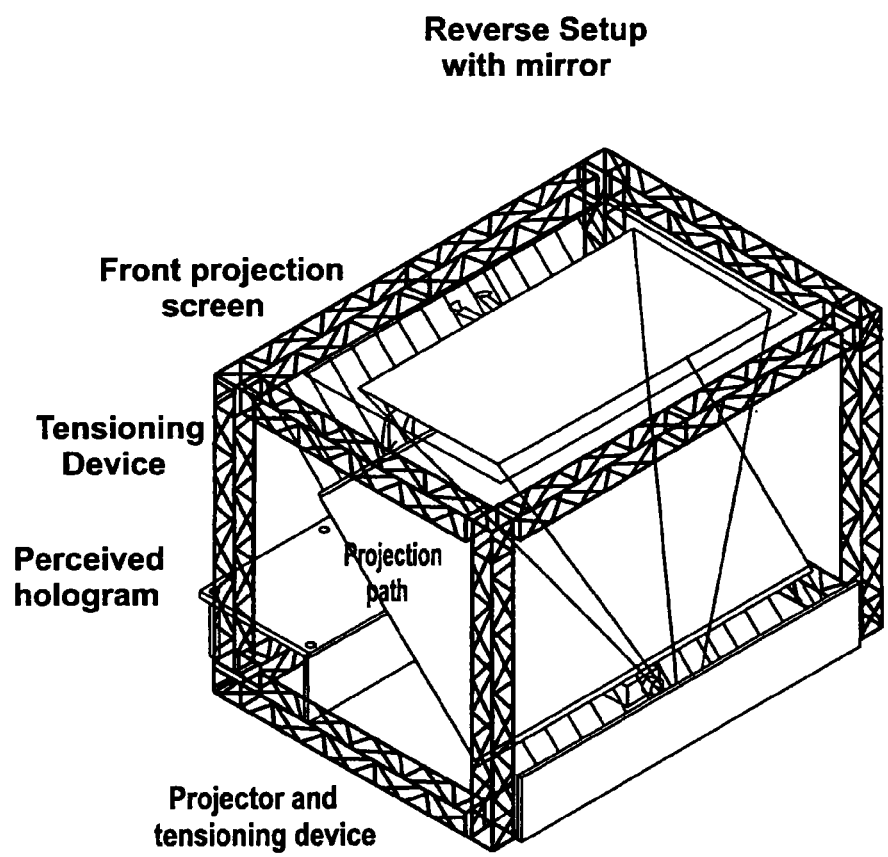
Figure 19:
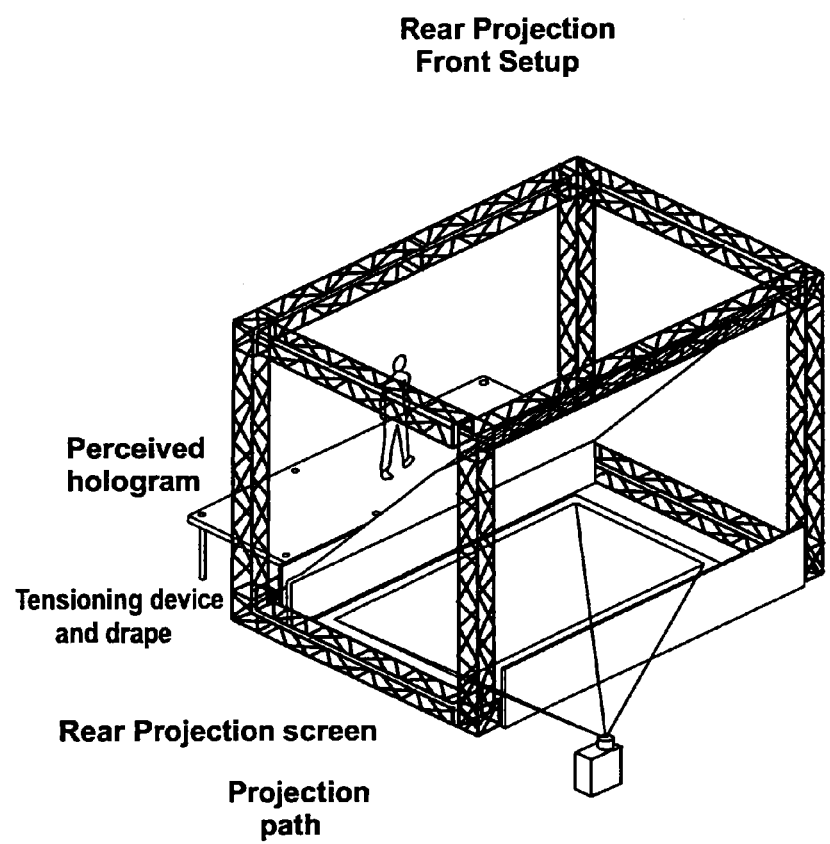
Figure 20:
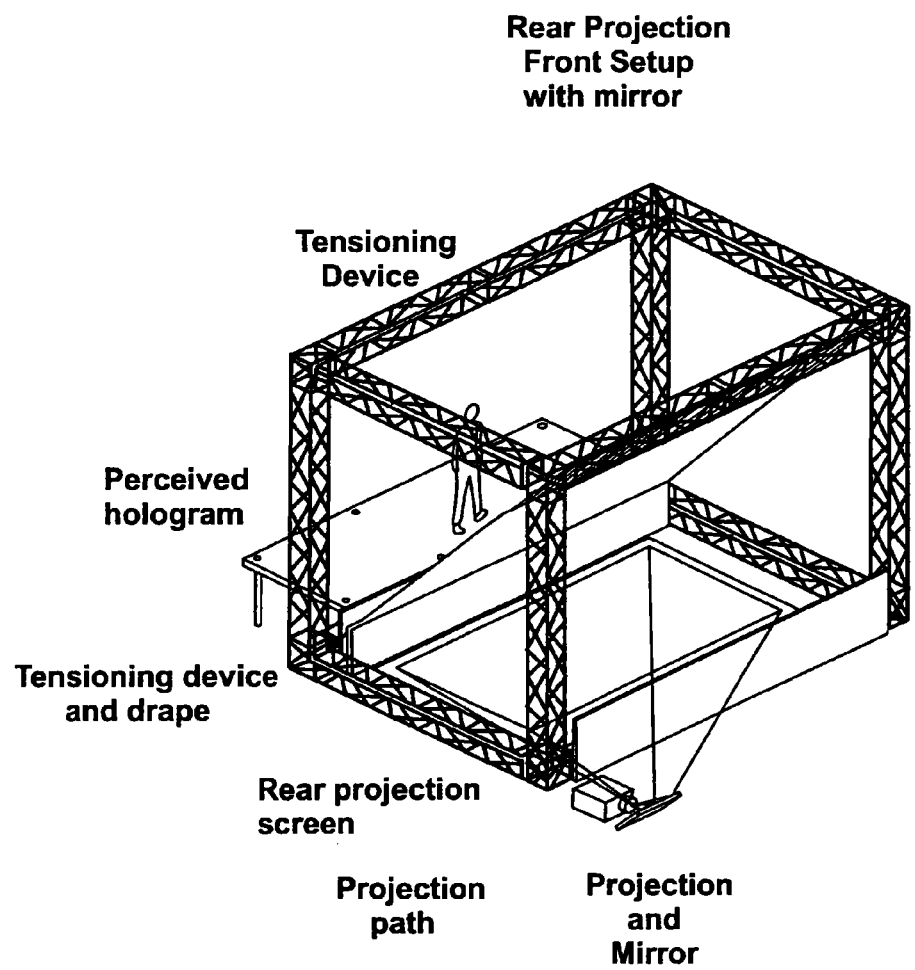
Figure 21:
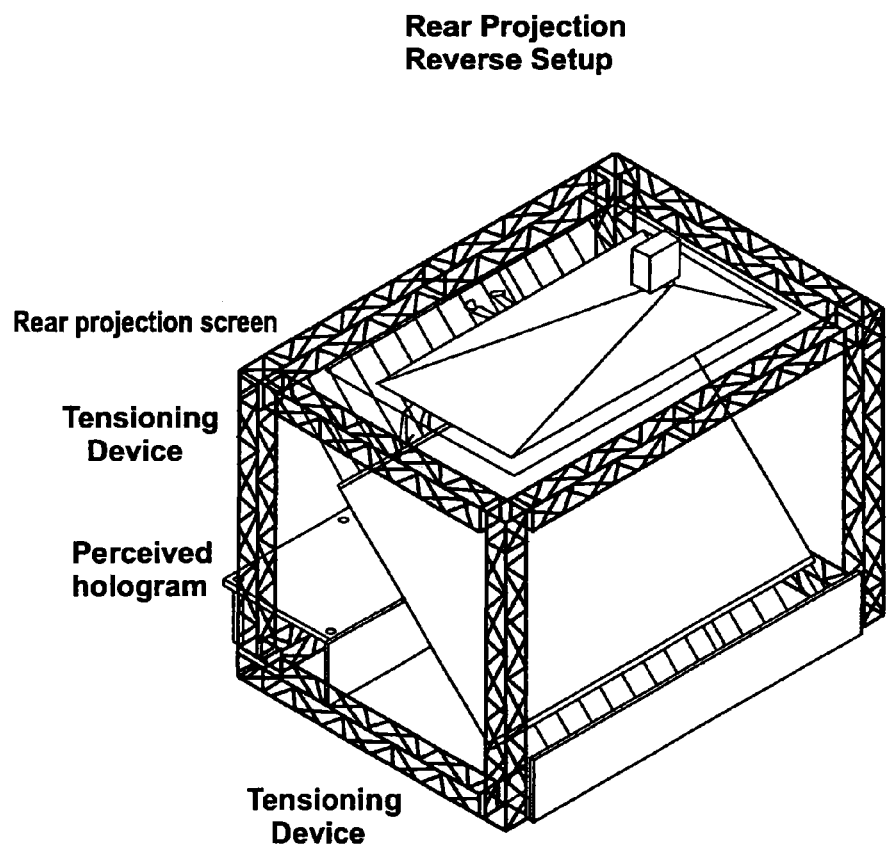
Figure 22:
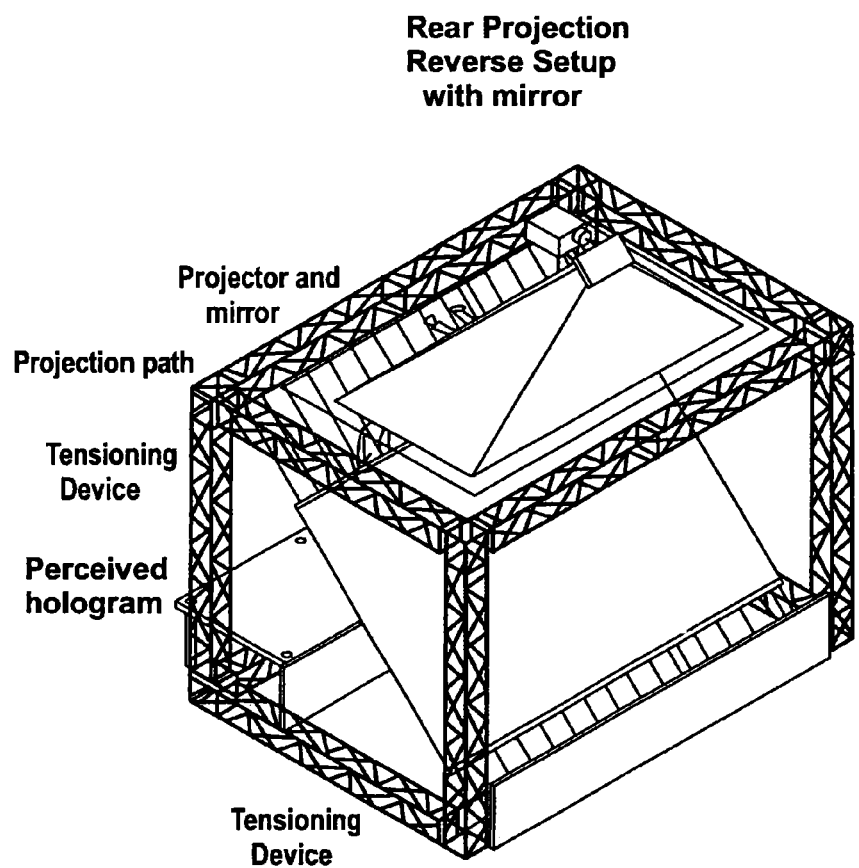

Another challenge for performing a realistic TP experience upon a stage rather than around a table is that of real time positional reference devices. FIG. 4 shows the positioning of monitors/screens for:

a) Broadcast Stage (BS), live talent (Compare) interaction with TP virtual figure (Performer) from SF Source Stage (SS).
b) SF Source Stage, the virtual Compare interaction with live Performer SF-SS.
c) Live Performer on SF Source Stage interaction with TP audience facing broadcast stage.
d) Heads up display teleprompter on BS to reference live Compare or Presenter for realistic positional stance and eyelevel relative to specific audience areas, whilst enabling Compare or Presenter to read text or any other video image during Performance. This includes a video image of audience members selected by audience cameras (see cameras below).

For the purposes of invention, Compare could also include multiple characters interacting with the TP virtual figure/s. The solutions proposed can be scaled as multiple feeds of virtual figures via TP from BS to SS or SS stage to BS.

The conventional methods of positional reference for existing TP is to use large HD 1080 plasma or LCD monitors with HD cameras attached. The monitors thus serve the dual purpose of capturing and displaying the TP virtual images from either stage/s. The monitors are positioned stage left or right out of view of the audience, viewable to the Compare and Performer (C&P). Their object is to provide real time eye to eye contact between (C&P), reading of C&P body language and positional reference relevant to each others' stage position.

Limitations are that the viewable movement of the C&P is restricted to either/and the capabilities of the camera lens frame of the monitor screen size. Movement up-stage or downstage is particularly affected if the monitor is arranged vertically since a 16×9 screen on 65" monitor measures just 60 cm along its narrower edge. Moreover the cameras attached to the monitors filming the TP SF are conventionally designed to provide images filmed in the conference room environment—controlled lighting and limited participant movement seated around a table. Thus their lenses are not optimised to best capture the C&P proceedings in a larger stage type area, lit in a more theatrical fashion.

Monitors could be replaced by conventional front or rear projection screens displaying the TP signal by projection. This solution is preferable to the use of multiple monitor panels for technical and cost reasons earlier explained. From a practical point of view a bank of video screens on stage is also cumbersome to assemble or locate unobtrusively.

The conventional projection carries certain disadvantages however—not least the positioning of the projection path. For optimal referencing the base of the monitor or, in this case, the projection screen should correspond with the base of the stage. A projection path arranged to light a large screen around the base of a stage entrances is a hindrance to live talent or indeed back stage support staff operating around these crucial show areas, regardless of whether the screen is front lit or back-lit.

Another alternative is the use of a smooth, semi transparent, anti static, easy clean fire retardant foil tensioned within a frame arranged in a number of different fashions using a variety of video sources.

The Foil frame could be made of a lightweight polymer, steel, carbon fibre or aluminium suitable for easy stage flying, so it may be attached to a conventional stage flying system or simple movement motors for storage flat in a ceiling. The frame carries adjustment allowing the foil to be re-tensioned repeatedly for a wrinkle free and flat surface finish during operation. The foil's anti static easy clean finish assists in retaining the foil's smoothness and optimal screen clarity.

Figure 23:
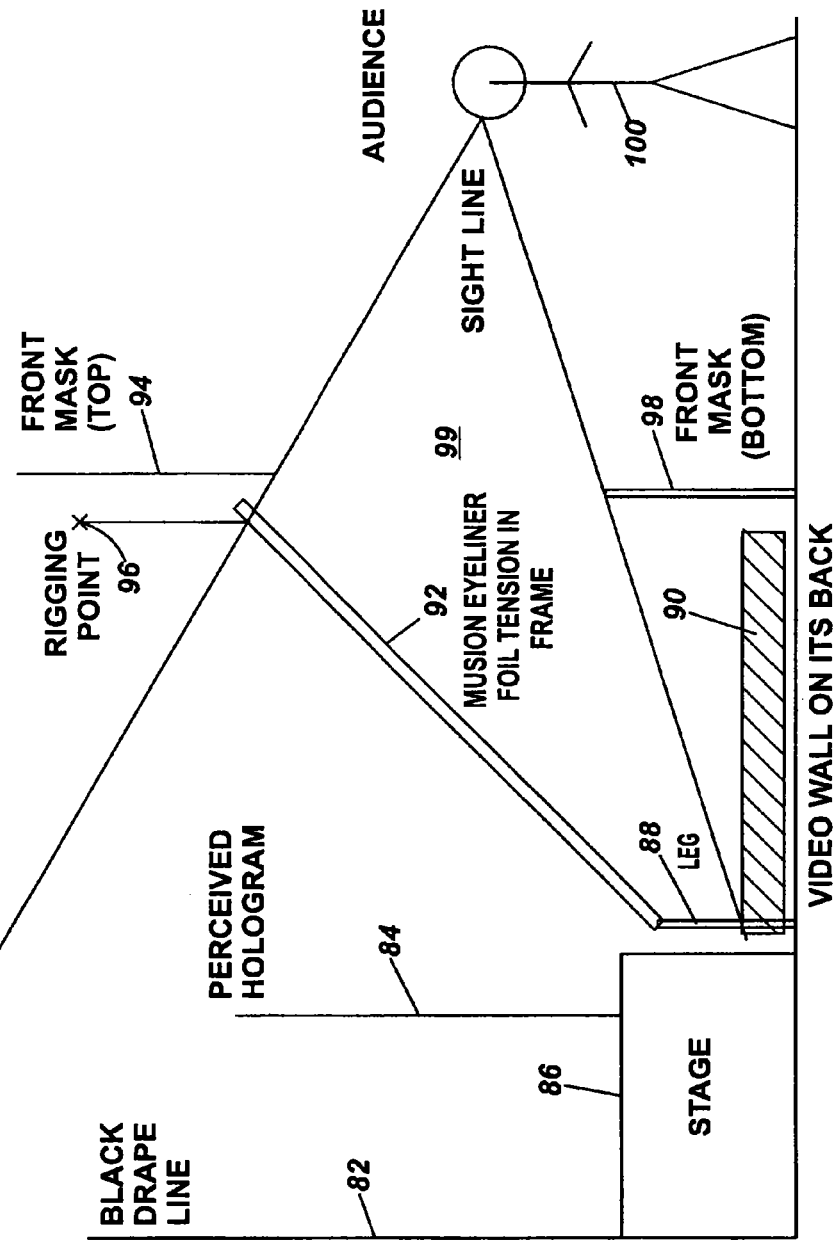

The Foil frame could be attached to a front of rear projection screen in a variety of configurations known as peppers ghost shown in FIGS. 5-22. The FP/RP screens display source video images from projectors (preferably 1080 HD), or the foil directly from video or LED walls, which too can be attached to the Foil frame. This is shown in FIG. 23.

The frame could be attached directly to a plasma or LCD monitor. Using a 103" plasma hung so the screen facing towards the foil reflects an image the other side of the foil—is big enough to display full size human beings as a single codec signal using a drastically reduced projection path distance compared to projectors and bounce screens.

The monitor may be located facing upwards towards a foil angled downwards at 45 degrees, fully horizontal under a clear protected stage floor. This configuration allows the stage floor to be used in an area that would otherwise be reserved only for beam through onto the foil.

Another embodiment is an adjustably moveable stage set—partially submerged, more vertically inclined in the stage floor, the screen, frame and monitor disguised from audience or TP source talent view either as invisible black or as a component of stage set/scenery. Similarly, the Foil frame and monitor could be flown and operative above and away from the potentially busy stage entrance.

In summary, the use of an HD screen monitor of sufficient picture quality, brightness and size, positioned to screen its image as a peppers ghost through a foil creates significant extra stage floor space and convenience to the live talent performing on and around the stage and stage entrances.

Alternatively, the Foil frame could be isolated to work with video sources projecting remotely to it. This arrangement is shown in FIG. 23. In this embodiment powerful but heavy projectors or LED wall are installed in more permanent fixings above or below the stage set, their chassis and projection path positioned to avoid interference with the movements by live on stage talent.

Figure 24:
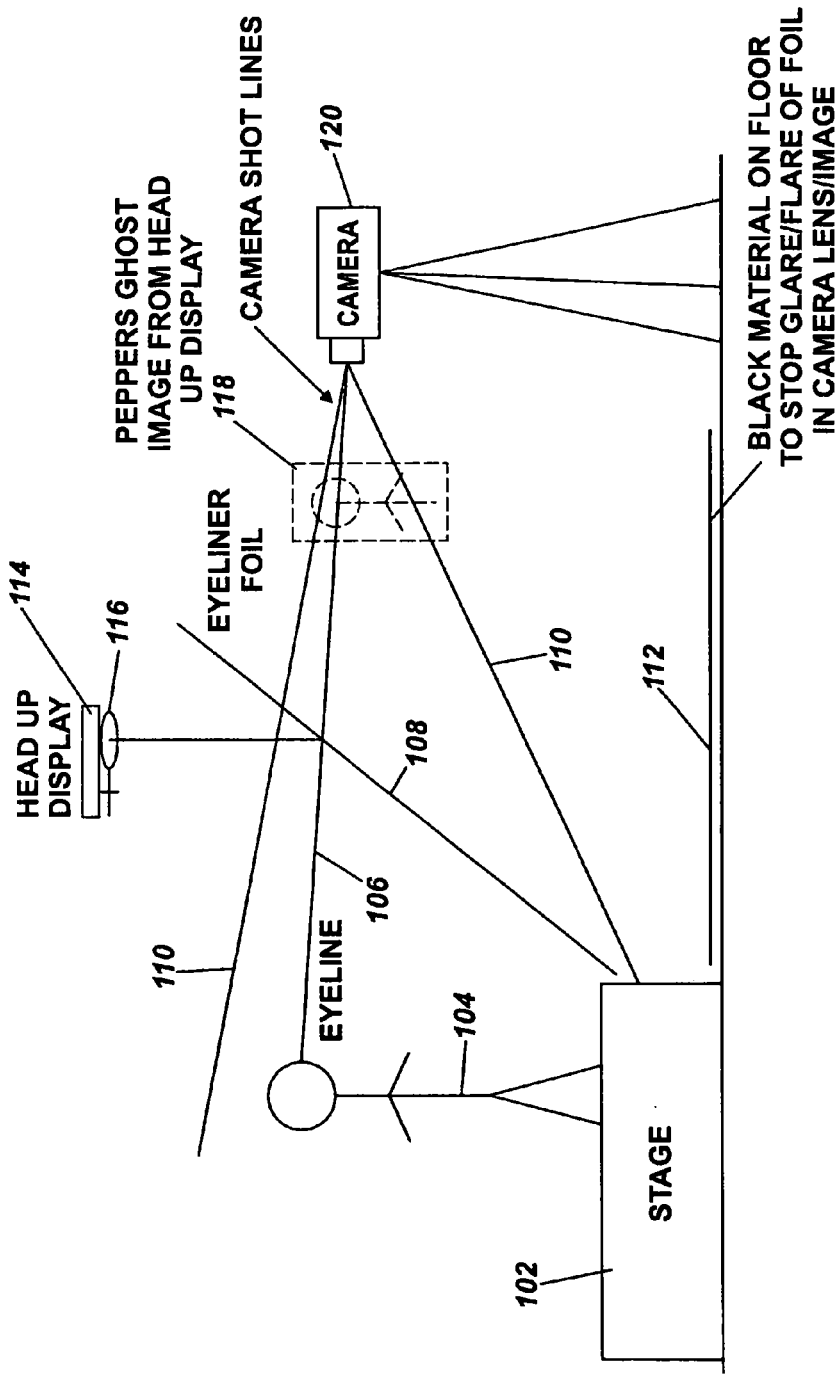

All of the above configurations also provide a further advantage of positioning the camera lens for TP SF capture. By using a monitor panel or conventional projection screen the camera lens must be located about the periphery edge of the display. Using a transparent foil allows the camera to be positioned anywhere, including directly behind the screen as shown in FIG. 24. The foil if correctly prepared during installation shall have a smooth uniform surface that does not impede the lens view of the TP camera allowing images to be captured by shooting through the foil. Moreover the appearance camera side of a virtual image visible to the live talent or audience also does not affect the lens view whatsoever.

This feature is of practical use for providing line of sight guidance to talent requiring accurate eye to eye contact during two way real time video communications and/or in the design of a TP meeting room or area of limited size. The live talent upon either the SS or BS is able to view 'hard copy' references through the transparent foil screen as well as the virtual image. Such a hard copy reference could be a light or signal designed to accurately guide the precise direction of eye view.

Another Foil arrangement is of particular advantage for displaying images as part of an enhanced TP system. The image, instead of appearing upstage (on the opposite side) of the foil to the C&P or live viewing audience, rather, appears some distance in front of the foil with no screen separating the virtual image from the live talent. This allows more accurate latitudinal positional reference (fore and aft depth of field upon a stage between the Compare and Performer, left and right positional reference relative to an audience).

The art of using parabolic reflective mirrors for display of virtual images is known. The image when viewed from a certain angle (albeit limited to a rather narrow front-on viewing angle) nevertheless appears to be floating in mid air. If the source image is 3D, then the floating image appears 3D too, even when static. The limiting factor for parabolic mirrors is the size of the mirror itself—being limited to the limited size of casting tools used in the parabolic 'bowl' or mirror manufacture.

Figure 25:
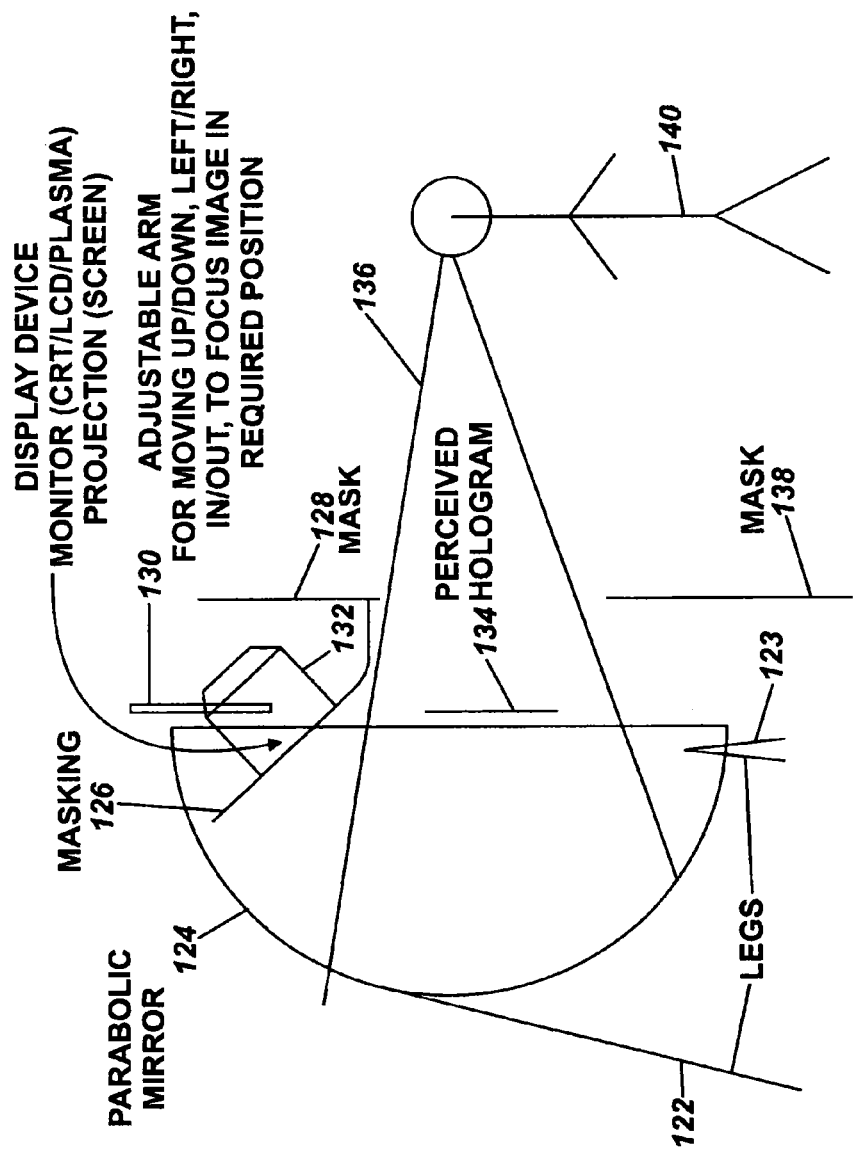

The distance between position of the virtual image and the foil apparatus (i.e. how far image appears in front of the foil) is determined by the depth of the mirror or bowl's concavity as well as its actual size as well as the distance between the source video screen and mirror centre. FIG. 25 shows parabolic bowls of variable shapes and sizes, configured with a direct video source such as a monitor or LED screen as well as a projector beaming onto a rear projection screen directed towards the central area of the parabolic.

To be effective in delivering a highly realistic and immersive experience, the virtual image should be HD video and if a human figure, life size. Regrettably current solid polymer moulds capable of use as parabolic mirrors and commercially available tend to be a maximum diameter of 2-2.5 meters and a depth 1-1.5 m. The image size achievable using practical projection means is a maximum of between 80 cm-1 m—not sufficient for displaying a life size virtual human.

One solution is to use a Foil vacuum blown to form shape in purpose built housing, to adopt and then retain the shape used in the cast of parabolic reflectors. This is achieved by tensioning a foil vertically at the front of the structure, much as a screen faces a monitor. The foil edges are sealed so that a vacuum applied to the box behind the foil eventually sucks the foil into a pre determined 'parabolic' shape. The foil depth of concavity could be varied according adjustment using variable vacuum pressure.

The foil shape could be retained in operation by vacuum but another, more desirable method of forming from foil a parabolic shape for permanent use is to simultaneously feed a solidifying liquid substance (such as liquid polystyrene foam used for extinguishing fire) into the box whilst the foil's correct parabolic shaped is retained under vacuum suction. Once the foam solidifies, the shape remains permanent. The foam is coloured black so once set the foil surface appears to be a shiny reflective black parabolic mirror.

The advantage of using foil is not just the ease of construction and potentially lighter weight than a solid polymer bowl of similar size. The key advantage is size. Optically clear/semi transparent fire retardant antistatic foil of widths 6-8 meters would provide the necessary sheet size enabling a parabolic mirror to reflect virtual images sized up to 2 m high.times.2 m wide.

Various configurations are suited to a variety of applications where TP interactive figures would be of benefit. For stage applications the mirrors may be used effectively face on to the live stage talent. The angle of view is such live talent can simply reference themselves to interactive virtual images for spatial distance as well as left right movement over reasonably large stage areas, yet the audience does not see the virtual image emitting from the foil parabolic mirror.

In other applications such as retail shop windows or museums the parabolic mirror is arranged face on the viewing audience.

Conventional TP cameras attached to monitors do not offer features required for the most immersive of TP experiences. The signal image has a very limited positional and movement sweet spot to capture realistic virtual images—in a narrow width band of 1.5 m and a maximum distance between lens and subject of up to 8 feet (2.5 m). The cameras do not carry adjustable iris that could be electronically controlled to adjust for variable lighting conditions (as might be found on a theatrical stage or used in filming subjects of different textures and colours). The absence of iris adjustment results in images looking too dark or appearing bleached out. Incorrect or uneven lighting renders the TP images somewhat unrealistic. For certain image colour types (pure reds or colours like brown that include reds) insufficient lighting levels also cause motion blur. Correctable using brighter lighting arrangements and faster shutter speeds.

The lack of zoom adjustment (mechanical, electronic or otherwise) restricts the field area the lens can film thus restricting camera placement (to the busy sweet spot of the stage entrance). The lenses found on existing TP feature a zoom insufficient to film an area any bigger than a 103" monitor. Restrictive movement reduces realism, particularly for performances of moving entertainment whilst introducing for C&P unwelcome movement boundaries that may hinder performance spontaneity generally.

By providing for the camera to shoot effectively through a transparent foil from some distance behind the screen, camera placement is more flexible. A camera able to work with a variety of professional zoom lenses, with adjustable shutter speeds and multi-video standards would be more effective in capturing a greater field area of view lighting thus allowing Performers greater freedom of movement and spontaneity.

A common standard HD Cam are the Sony models HDW X750, HDW 790, F900R, all of which are single link HD SDI processing 10 bit 422 colour streams at 1.485 Gigabits/per second and F23 which is both a single and dual link HD SDI processing 12 bit 444 colour streams at 2.2 Gigabits/per second. These models yield finest picture results using the HD SDI signal at 50/60 frames interlaced per second. Progressive cameras include the Panasonic AJ-HDC27HE 720P Varicam and Red Camera—capable of 4K resolution. However because of Progressive signal's higher data capacity demands per frame versus interlaced, it is common for these cameras to film at just 25 frames or in USA, 29.97 frames Progressive per second. TP at 50 frames Progressive HD is not yet commercially available as the signal data rate is too great for conventional codec to manage and compress.

Progressive signals offer sharpness, particularly for static images when compared with interlaced video, which tends to have softer, less crisp edges. Conventional TP systems display seated images upon a 50" screen. Movement is limited, thus TP codec using 1080P as the video standard (such as Cisco TP) images appear sharp. Progressive HD is less well suited to handling bi-directional subject movement. This is because at the same frame rate, progressive video will use twice the bandwidth of an interlaced signal. The result is that an interlaced signal (typically 50i/60i-50/60 frames per second (fps)), though only half the horizontal resolution of a 50/60 fps progressive, has more moving fields per second which to the eye appears to offer a smoother motion at the same frame rate. This is because for the process of displaying a field of video an interlaced signal is consuming only half of the progressive signal's bandwidth.

Moreover Progressive HD looks less realistic than an interlaced signal when used to display realistic looking virtual humans using the foil peppers ghost technique. Progressive HD images appear flatter to the viewing audience—like 2D film images. This is because the image is composited as a whole, rather than being interlaced. Interlaced HD signals of at least 50 frames per second are ideal as a video standard for motion virtual images using foil projection. This is because an interlaced signal of 50 frames per second has twice the time based frequency compared to progressive 25P (despite the same bandwidth). Text and graphics, particularly static graphics, however benefit from being generated using a Progressive signal of at least 25 frames per second because progressive displays the complete frame of video in one unit of time (every $25^{th}$ of a second) versus interlaced showing just half a complete frame every $50^{th}$ of a second resulting in a progressive signal effectively doubling the horizontal resolution to form smoother, sharper outline edges for static images. Thus a camera used for TP human filming should be HD-SDI enabled. The frame rate speed should be higher the faster the movement. Hence certain HD cameras used for filming sport can run up to 500 frames a second. For dancing performance and other sudden movement scenarios, an HDSDI signal at 120 frames per second would be most ideal. The data rate requiring real time encoding (compression) would be higher than 50 or 60 per second, but the final compression to SF codec would be 20 M/bits per second. High speed frame rates would therefore be transmitted via codec using the picture optimised encode. Slower film frame rates are engaged for Presenters with less movement.

In summary a camera utilising a light sensitive high quality wide angle zoom lens with adjustable shutter speed, frame rates adjustable between 25-120 frames per second (fps) interlaced, capable of shooting at up to 60 fps progressive, would address the key range of performance requirements for most kinds of video imagery, from static texts and graphics to streaming images of virtual Presenters and even movement artists.

It would be desirable for the camera to have a remote moving head attached to a 'magic arm', allowing motorised mechanical movement anchored to a convenient mounting position. It would be desirable for the camera's features and adjustments to be controlled remotely via LAN and to programmable to environmental pre sets (such as shutter speed responding to programmed subject matter/lighting inputs).

Figure 26:
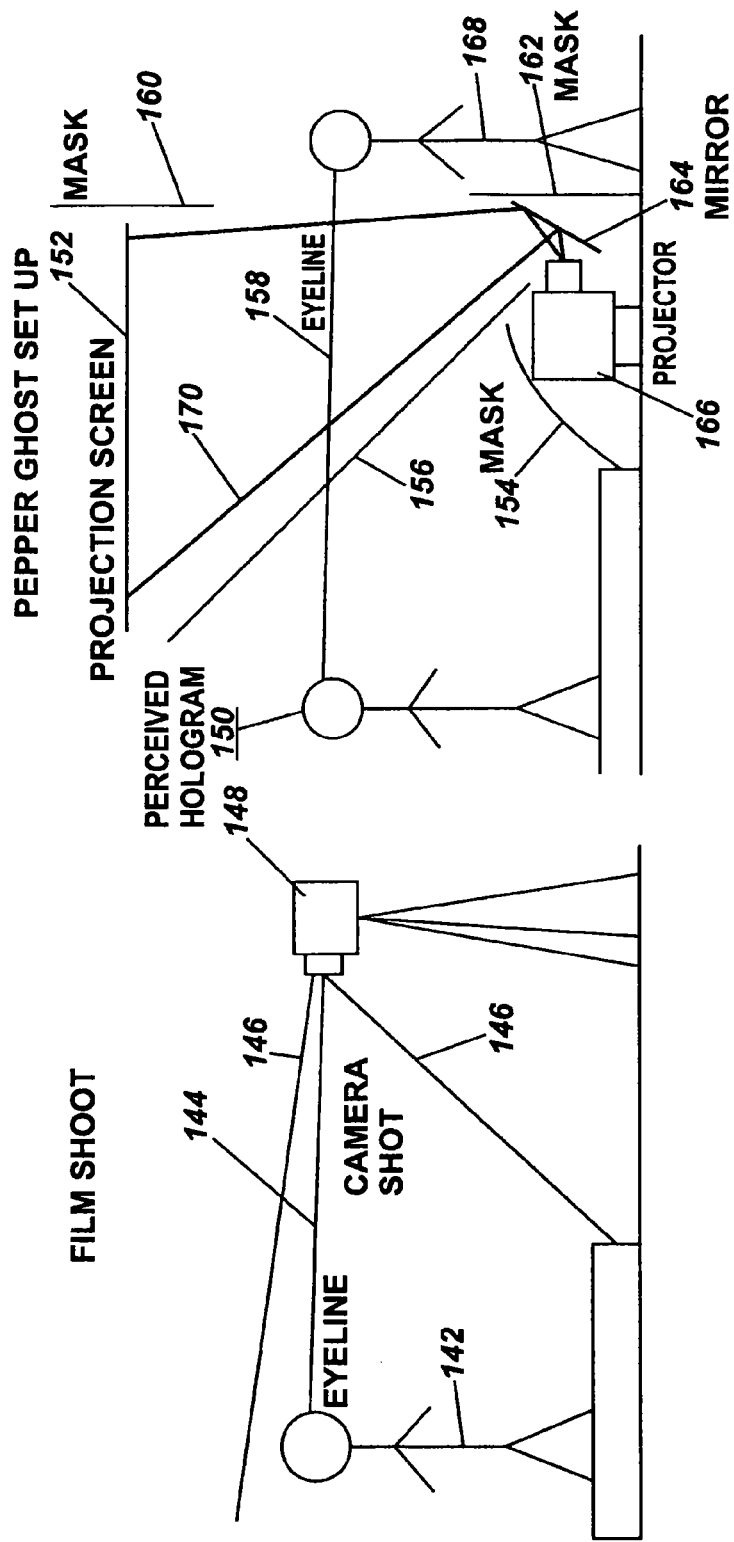

The camera's position varies according to its function within the TP System. If the camera is to provide the SF for an on stage virtual Performer, the lens position relative to the live Performer should correspond to the eye line view of the watching audience as shown in FIG. 26. The Source Stage Performer feed to Broadcast Stage is perhaps the most important task to overcome challenges in order to optimise visual quality. As the main subject of the stage show the Performer will be the key to determining show realism overall.

The appearance of depth up stage/down stage is an illusion. This illusion is most effectively performed when the audience eye line is just below the line of the stage floor and the camera lens filming the live Presenter is positioned at least 5 m away from the subject and angled corresponding to the angle of audience view. By way of example, the angle of view is ideal when the viewing audience is able to witness glimpses of the shoe soles belonging to the virtual Performer as he or she walks about the stage. However it should be noted that in circumstances where the camera view is shooting through a foil in the design shown for a pair of mirrored TP rooms, then the lens view must clear the ancillary masking of the projection pit enclosing the reflective 'bounce' screen.

Raked audiences benefit from viewing Performers upon stages that are also raked to the corresponding angle. See Claims 11-14 Musion Patent Application GB 0625525.1 Video Shadowing concerning arrangement of a stage using a height adjustable audience chair.

The frame size of a camera lens determines the field area sent as SF. Broadly speaking, in order to optimise field area view and realism quality of subject matter within the frame size—referred to hereon as Plate Shot, should correspond to the audience viewing distance in a way similar to projection lens throw described earlier. Once the Plate Shot has been determined, the camera is 'locked off' i.e. the chassis does not move during operation.

Thus an audience seated 5 m or greater apart from the virtual image can be filmed using a 16×9 Plate Shot size of 5 m width×2.8 m high—more than 4 times the field area coverage of a conventional TP camera feeding the TP codec the same sized signal to a monitor screen.

For extra image solidity and sharpness both the Plate Shot and projection throw can be limited to a smaller size for example 3 m width×1.7 m high—thus maximising the projector's brightness into a smaller concentrated space and the 1920×1080 pixel panel used in forming the image of say 1.68 m high. This technique is particularly advantageous when a presentation or performance necessitates filming of the TP virtual figure on stage for real time video relay to large image side screens. The denser pixel count and brighter image looks more solid and realistic when enlarged to bigger side screens. This technique may also be used where bandwidth restrictions dictate HD images are projected using codec compression as low as 3-4 M/bits per second.

The next camera is positioned somewhere upon the stage pointing towards the audience. The objective of this camera is to provide virtual Performer with maximum visual general audience feedback and optimise eye to eye contact between Performer and audience members, collectively or individually. The precise location is dependent upon a number of factors. Overriding consideration should be given to optimising lens position to feed the clearest possible audience view to the live Performer on SS (virtual Performer on BS). Furthermore the camera view should if practical replicate as accurately as possible the perspective view of the BS virtual Performer relative to the audience—thus positioning the lens at approximate eyelevel is desirable. In the event a large audience is present more than one camera may be used. Indeed for large audiences a number of solutions are available.

The first solution is to mount a remote head camera or multiple remote head cameras using magic arms, enabling these cameras to move whilst anchored to a mounting point. The cameras could be equipped with lighting integral to the chassis, to assist in the lighting of film subjects. The cameras are equipped with variable zoom facility enabling remote adjustment in fore/aft range of at least 10 m. The cameras are capable of remotely adjustable iris to light intensity and adjustable shutter speeds allowing their speeds to be varied as a means of reducing motion blur in the filming process. The cameras are enabled to process either progressive or interlaced HD video signals. For displaying seated audience images a progressive signal is desirable. The cameras may be fitted with microphones enabling voice recording in real time. The camera may be enabled to recognise and track a signal or object (such as an infra red or ultra violet light, or a black and white patterned barcode). Once the lens registers the signal, pre programmed settings direct the camera's view.

Thus in an audience of hundreds or even thousands of people, when an audience member is chosen to interact in real time with on stage Performers or Compares (live or virtual) an audience management system may be used that highlights in a way recognisable to the camera lens the precise position of that audience member. The program control of the camera would enable the zoom lens and any additional light or sound recording devices to focus predominantly on the audience member, feeding back an image to the live or virtual Performer that is clear and referentially accurate in terms of eye line.

Figure 27:
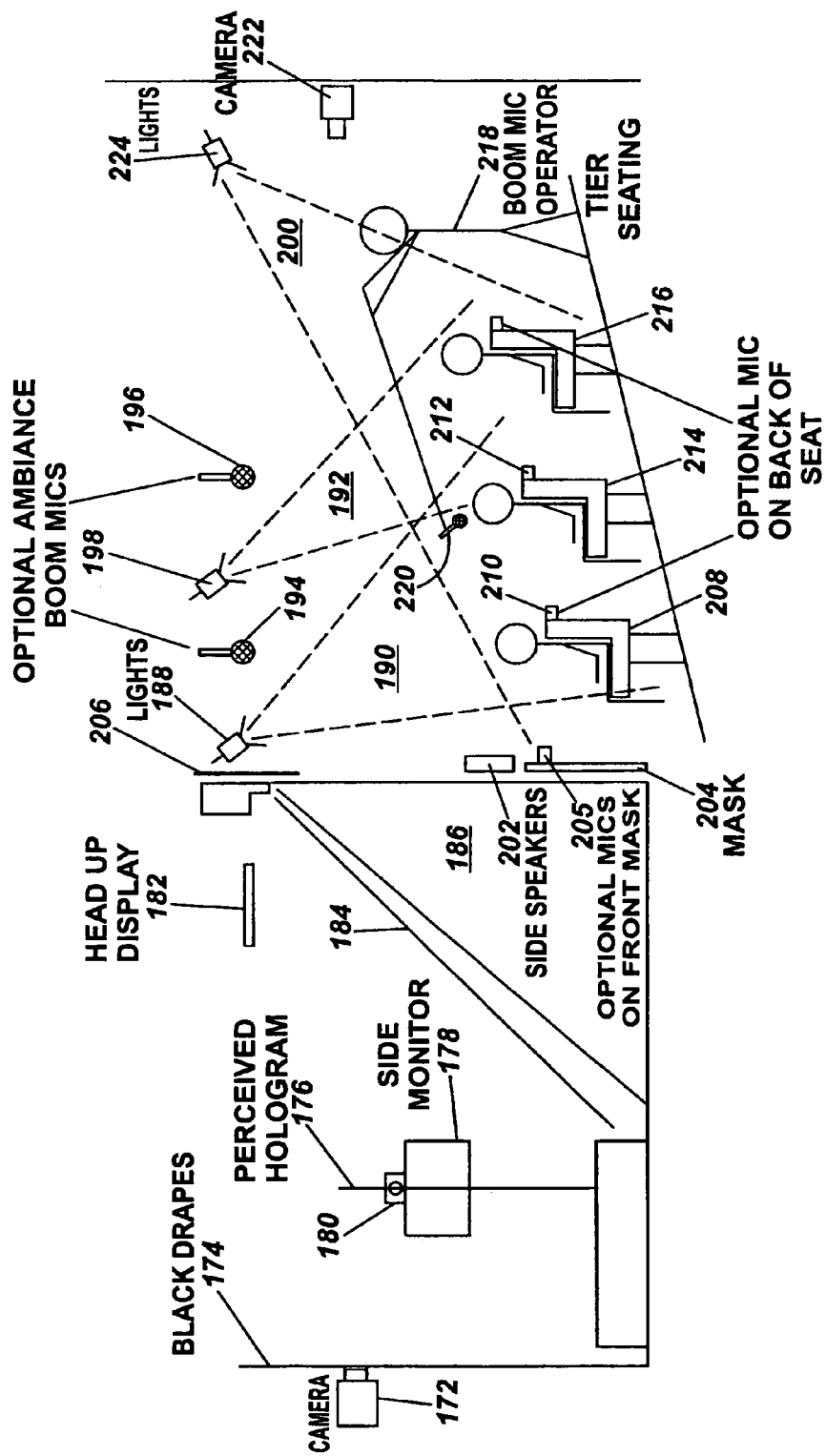
Figure 28:
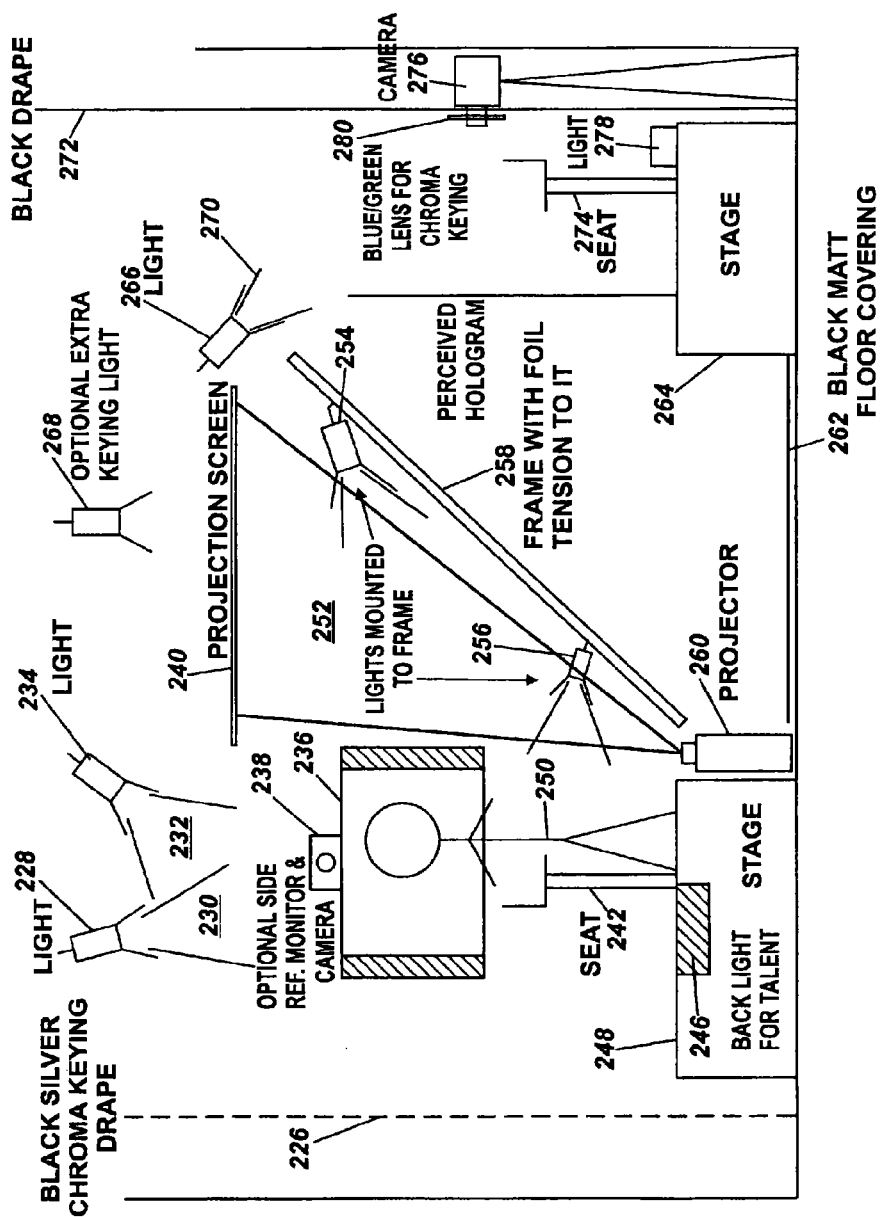
Figure 29:
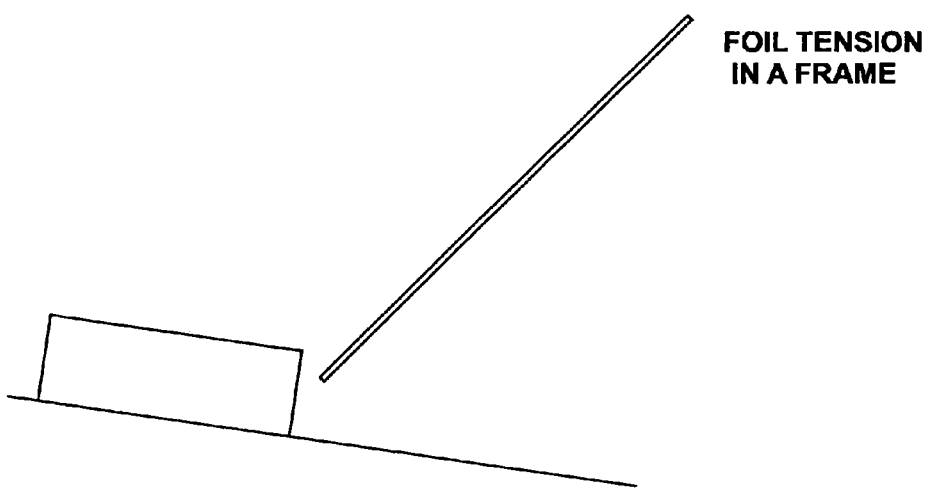
Figure 30:
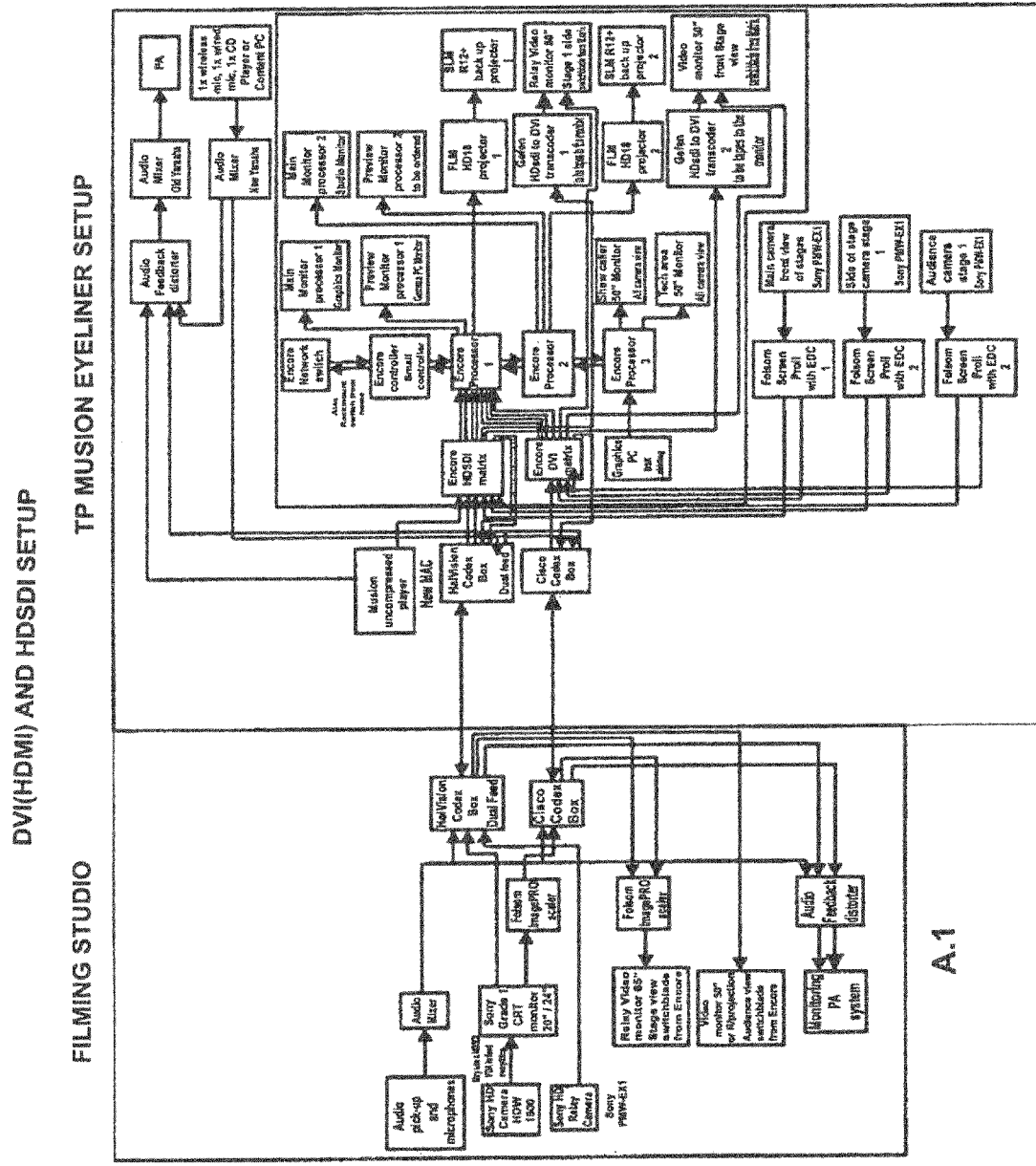
Figure 31:
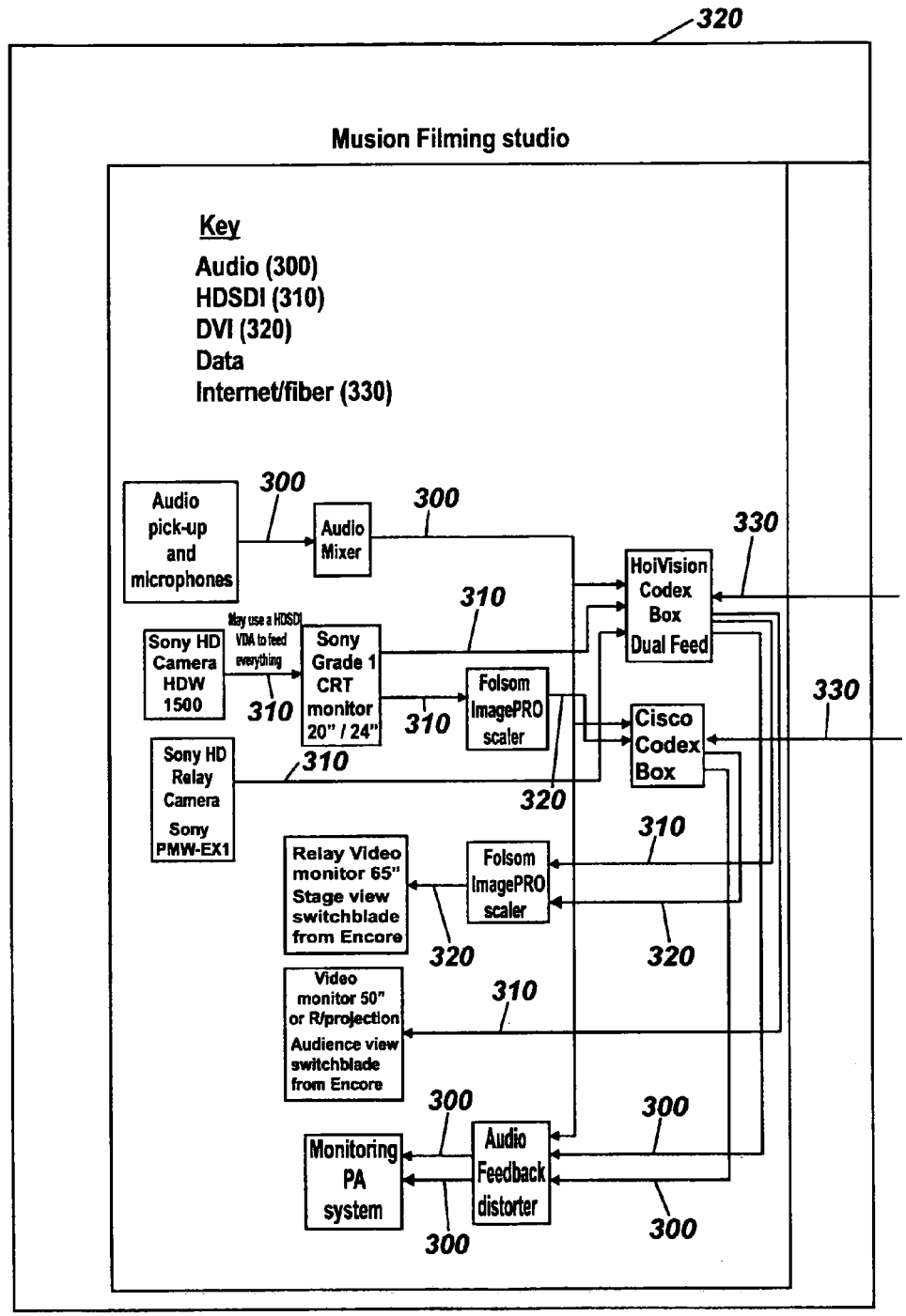

The light or sound recording devices used for audience members may be pre set. Lighting is permanently installed and powered on to light the audience/individual audience members whenever needed. Cameras and microphones arranged likewise. FIG. 27 shows how an auditorium might be configured for light, camera and sound. FIG. 28 shows how a smaller TP meeting room might be configured. The arrangements show lighting and sound recorders arranged throughout the auditorium. Lighting is angled towards the audience and away from the stage so as not to feed back as much audience vision as possible to Performer whilst not impeding audience vision and experience of the foil projected images.

Another solution would be to use audience seating arrangements that were better suited to facilitate interactive experiences between both remotely located TP virtual Performers appearing on stage by way of foil projection and live Compares or Performers appearing upon a stage where foil projection is operative. Each audience seat block or individual seat would be equipped with devices enabling the audience member to table interest to interact with the stage talent—e.g. to ask a question—such that when selected, the seating area around the audience participant is then automatically lit for optimal motion video image capture, a nearby sound recording device and remote head camera (located on a magic arm either individually to each seat or seat block) activates to begin transmitting a suitable Audience Signal Feed (ASF).

The ASF can be then routed to one or more reference screens located either upon the BS or SS. The BS screen may be a conventional monitor panel located in the front of the stage (projection pit) to face the live Performer or Compare directly. The SS screen may also be a conventional monitor panel located close to the lens of the SF camera facing the SS live Performer (virtual Performer on BS). However a drawback to both scenarios is the screen being anchored to a fixed point, the positional reference for which may bear no resemblance to the positional reference between the audience participant and the live Performer or Compare on either stage.

The screen located at the BS may be mechanically moveable stage left or right according to angle of audience participant relative to the stage talent. However, whether placed in front of or above the stage, the audience participant image could not be satisfactorily positioned at eyelevel to the live stage Performer or Compare, without the monitor frame being visible to the audience. This would be a distraction to the immersive experience sought.

This problem is most conveniently solved by mounting a mechanically moveable video screen/s upstage to the foil, the foil is inclined at an angle with respect to a plane of emission of light from an amplified light source (projector using RP or FP, LCD, LED or powered lights); the foil having a front surface arranged such that light emitted from the video screen is reflected therefrom; and the video screen being arranged to project an image such that light forming the image impinges upon the foil upstage of the audience (and thus invisible to Audience) such that a virtual image is created from light reflected from the screen, the virtual image appearing to be located behind the screen, or down stage of the Presenter.

The video screen may be a conventional LCD/TFT monitor panel. It may be attached to the stage truss framing the foil screen and positioned in a substantially horizontal fashion, screen angled downwards towards the foil (in a similar way to the 103" panel fixed to the foil described earlier). The video signal from the monitor appears to the live Performer or Compare as a peppers ghost image floating directly above or amongst the audience participants, yet the images are entirely invisible to the audience. This is similar to the earlier principal of a camera shooting through the foil even whilst a virtual image is masking the camera's presence.

The monitor/screen may be mechanically moveable stage left or right along the truss using rollers. The angle of the screen may be remotely adjustable to position the reflected peppers ghost image higher or lower around the audience. The position of the monitor/screen may be referenced to the position and eye line angle between the live Performer or Compare on stage, relative to the position of the audience participant. The image upon the screen may be a close up camera shot of the audience participant creating the illusion of a virtual audience member, highlighted or enlarged as a peppers ghost image appearing in the same seating block/seat as the live audience member. The use of an ASF through the foil brings the communicating parties 'closer' enabling the live on stage Performers and Compares to experience a facial detail and intensity of audience interaction (including eye to eye contact) not previously possible.

More than one screen may be used so that the range of motion along the truss does not impinge on the operation of other video or light emissions concurrently operative with the foil. The immersive impact of this effect is greatly enhanced for audience participants if the on stage talent is filmed from a downstage location, the images being transmitted real time to larger relay screens located either side of the stage or to the side of or above the audience areas generally. This arrangement allows better body/facial detail of the live talent to be seen by the audience during performances.

The video screen facing the live performer in the SS could also be a conventional 50/60/82/103" monitor panel, positioned close to the camera lens filming the SS live Performer for relay as the virtual performer on the BS. This arrangement is practical where the audience numbers are small, each audience participant being clearly visible at the same time.

For larger audiences or circumstances where the camera lens filming the SS live performer is some distance away (say greater than 5 m) an image projector beaming the ASF/s onto a rear projection screen (RPS) located just above the camera lens is desirable. The RPS can be of any size, but to offer greater utility than a monitor should have a surface area of at least 3 m×2 m, arranged vertically or horizontally according to the shape of the audience viewing area and the frame of the camera lens feeding the ASF/s. Preferably the projector will be a 1080 HD, capable of processing, both progressive and interlaced signals respectively, through DVI/HDMI and HDSDI interfaces built into the projector.

The ASF/s appearing on the RPS could consist of one or more images. One image could be of the entire audience fed from the on stage TP camera. Another image could be of the individual audience participant fed from an additional camera positioned above or within a specific audience seating block close to the participant. Using a suitable video processing device such as an Encore or Spyder, the video image could appear upon the RPS as a scalable picture within picture— that is an image of the participant within the image of the entire audience. To assist with maintaining eye level contact, the precise position of participant image upon the RPS could be referenced to the participant's position in the audience, relevant to the onstage position of virtual Performer appearing on the BS.

Another solution would be to arrange the SS camera filming the live Performer SF to the BS behind a smooth transparent foil tensioned within a frame and arranged at an angle of approximately 45 degrees to the floor. The lens would be positioned in the central point of the screen, corresponding approximately to the central point of the audience. A reflective projection screen (RP or FP) may be arranged on the floor or the ceiling of the filming studio. The projection screen emits the ASF image/s in the same way as the conventional RP screen. However the positioning of the filming camera lens central rather than peripheral to the audience field area significantly improves referencing for better positional reflexes and eye level contact between audience participant and SS.

This final arrangement is the preferred set up to be used for a TP meeting room experience. In this particular embodiment, a foil tensioned within a frame is arranged at 45 degrees to the floor, approximately in the center of the room, almost cutting the room in half. A projector is arranged as shown in FIG. 28 to project a virtual image upon a stage from a remote SF. The stage is framed on 3 sides by dark covered walls and ceiling. A suitable TP camera is arranged at one end of the room, upstage of the foil, in the same field area as the virtual images, to face the live talent/audience participants. The far wall facing the camera can be covered either with black material drape or, in short throw distances (where lighting required to illuminate live stage talent would otherwise spill onto the wall causing the black material to become grey), a blue-screen/green-screen back drop and floor arrangement is preferred. This is because if the black curtain is over lit such that it turns grey, the clarity of the virtual image is compromised, particularly around the image outline—a fuzziness which renders the virtual image less realistic.

The preparation of a blue screen or green screen room does present challenges in time preparation and practical considerations during use. Firstly the time and expense to cover the relevant wall, ceiling and floor surfaces could in some cases be burdensome. Moreover the intense coloured surroundings can be distracting to the live talent Performers or Audience Participants. A further practical consideration is that if a screen is painted blue then any subject matter in whole or part that includes the colour blue when filmed will appear invisible (or transparent if projected using foil). Thus an item of blue clothing or blue colouring on an item being filmed for presentation will lose form and realism. The same issues apply to a green screen room.

Where this solution is found to be expensive or impractical another solution would be to create a virtual blue screen environment by arranging along the facing wall a grey silvered curtain which when filmed with a camera lens ringed by a circle of tightly formed blue LED lights is designed to automatically key out the background and isolate the subject matter in the foreground. The curtain is unobtrusive and works as a means of keying out foreground subjects (ideal in peppers ghost projection) even when subjected to a fair amount of light spill from high powered filming lights. Blue or green items of clothing film perfectly satisfactorily.

This solution is particularly preferred when the filming room has limited space, say less than 12 m depth.

A modest lighting arrangement lights the room upstage of the foil to provide the illusion of depth for the virtual image. A more substantial lighting rig is arranged downstage of the foil to correctly illuminate the live talent being filmed. This lighting rig may be free standing. Preferably the lights will be retained by a truss frame, possibly an extension of the foil truss. Two rooms arranged in this way with cameras and video sources networked in a TP configuration would provide an experience akin to a giant telephone box featuring life size, life like real time interactive communication between at least two remote parties.

The final reference camera positions are those to provide necessary reference for interaction between live and virtual stage Performers and Compares. At least one camera and display screen is required for each stage. The object of these cameras is to provide accurate positional reference of the on stage talent movement. Their deployment has been detailed earlier. The frame rate/data rate/encode of these signals may be subject to the greatest compression if limited Internet bandwidth requires them to be so, since these images are not viewable by the audience. The cameras maybe positioned anywhere convenient, but desirably they will be positioned at eye level. The screen display may comprise a conventional monitor panel, rear projection screen, an optically clear reflective foil or a foil parabolic mirror. Black curtains would be the most preferable backdrop to filming each live stage talent and in certain circumstances the silvered grey screen arrangement could be used.

The immersive experience for TP is completed by selecting, arranging and programming the correct lighting configuration. The key areas to be illuminated are the stage and backdrop on the BS (to provide depth and contrast for live and virtual talent), the live talent upon the stage (for live audience view and TP camera for SF to SS), the live audience at BS and the live presenter at SS.

A range of lighting is available for each application. Overall objectives are to present an environment of immersive ambience to the venue overall, a compelling mixture of colour and contrast on stage and correctly illuminated live talent on stage and audiences for sharp, realistic SFs and ASFs.

Conventional TP lighting is able to satisfactorily illuminate seated live participants for the camera lenses to relay sharp HD images upon HD monitor screens. To light the live Performer in the Source Studio a more considered approach must be taken. The human figure for the purpose of lighting is essentially divided into two main parts (head to waist, waist to feet) but adds left and right control for the back of the head, face (shadow fill) and hair fill as separate elements. Lighting a human figure for a 'holographic' effect needs to fulfill the following criteria:

Be bright enough to capture subject detail in a uniform manner without dark spots (otherwise image becomes invisible or disappears) or overly bright spots (image bleaching). The lighting should pick out differing textures as well as cast shadow across the subject accentuating form and the passage of light movement across the subject. Back light should form a rim around the subject outline for maximum image sharpness.

The colour temperature of the lighting upon performer should when appearing as the virtual Performer on the BS yield a skin tone that is natural and matches as close as possible the hue and colour temperature of the skin tones of similar skin types performing as live talent upon the BS.

Lighting for 4-5 m Film Studio would Desirably Include the Following Components: 5× ETC Source4 (50° or 25-50 zoom) ellipsoidal spots* on high (14 ft) stands 4× ETC Source4 (50° or 25-50 zoom) ellipsoidal spots* on lowboys/turtles (lens height to match height of studio staging)

1× ETC Source4 (36° or 25-50 zoom) ellipsoidal spot*flown/hung as centre backlight

*Alternatives accepted: any 750 w HPL or 1 kW/1.2 kW tungsten profile/ellipsoidal spot with beam angles as specified 2×4 Bank 4 ft KinoFlos (tungsten tubes) on goalpost over studio staging 2×2 kW Fresnels on regular stands each through 4'×4' diffusion frame (F2/1/2 Diff)

2×650 w Fresnels on lowboys/turtles

A selection of large and small flags and Charlie bars.

Stands, knuckles, etc for above

Various black/white poly/foam core sheets and support

ND0.3 and ND0.6 filter

Hampshire Frost, F1/1/4 Diff and F2/1/2 Diff filter 4-9 ways of 2 kW dimming if available The key to lighting the live talent on-stage is to have the ability to match the colour temperature, intensity and angles of the lighting for the person that is being transmitted to the live stage. There are a number of ways which this can be achieved. One option is to use a number of static lights (generics) to firstly be rigged at the correct angles to light the live talent. These lights would then need to be colour corrected with gel to match the colour temperature of the holographic image. Another method would be to use moving lights to light the live talent.

The use of moving wash lights would make adjustments easier to light the live talent as one of the major problems with lighting using generic lanterns is that as you bring the intensity of light on the live talent down the colour temperature it emits will change and there will be a greater mismatch in colour temperatures. If moving lights are used they maintain a constant colour temperature as their intensities are reduced thus making the match a lot easier. Also the moving wash lights have an integrated colour mixing system using cyan, magenta, yellow and occasionally cto (colour temperature orange). These effects make it particularly suitable to balance the colour temperature between the live and the holographic talents.

Another element of the lighting for the live stage element of the TP is the importance of creating the illusion of depth on the stage so that the holographic talent appears to stand out from the back drop and therefore becoming more lifelike. Again it is possible to use generic lighting to perform this function. I.e. up-lighting the backdrop of the stage with floor mounted par cans, making sure that none of these lights illuminate the area behind the holographic talent as this lighting will overpower the holographic projection and take away from the overall effect. Care needs to be taken to also ensure that the lighting level is consistent throughout the viewing angle of the system. To make this task easier again the use of moving head wash and spot lights can be used with the addition of LED battons and par type fixtures. The advantage to using moving lights and LED technology is that you can alter the intensity, position, colour and texture on the backdrop to avoid the position of the holographic talent in the live environment. The LED lighting can provide a static colour changing facility with the ability to alter the intensity; this again performs the same function of the moving lights.

The fighting of the live audience element of the TP is another important element to the TP experience. The most practical method is to suspend a number of trusses above the audience in such a position that you can adequately front light and back light the audience at a reasonable level so that the camera relay can pick out people both for a close up camera shot and a wide camera shot. You could also use follow spots to individually light a member of the audience that the holographic talent has a specific interest in (i.e. questions and answers). An even more practical method would be to use moving spotlights suspended on trusses in a plurality of points to provide the same style of lighting as the follow spots.

Stage lighting preferably embodies the following basic equipment:

Lighting Desk
2×Mac 500's
2×Mac 600's
2×Mac 300's
1×Pixelline
1×32 amp 3 Phase power distribution box with 6×16 amp 1 phase outputs
8×16 amp-16 amp Cables
4×16 amp Splitters
8×10 m 3 pin XLR Cables
2×10 m 5 pin DMX Cables
4×5 m 5 pin DMX Cables
Basic Spec/Black Figure Version
Camera: Sony HDW750 or HDW790 or F900/3 or R shooting 1080/50i or 1080/60i/59.94i as
Required
Standard Lens
Matte Box
Polarising Filter
Tripod (tall and short legs)
Battery kit/mains Kit
20 inch (or larger) HD CRT monitor
Chroma background rig as suggested by studio
Notes for black-clothed subject:
Suggest blue/green screen as figure has to appear as solid (unlit) silhouette at start
Add 2×8×4 white poly for modelling
Add 2×2 kW Fresnels for above
Add memory lighting desk and dimming for all 'subject' lights (not chroma screen rig)

Peppers Ghost—Filming Guidelines

General

The aim of a Musion live action shoot is to produce a life-like, high definition video image that best fulfills the technical and aesthetic requirements of the Musion presentation system. It should also capture the most appropriate content for the project. Relevant elements include: a true 'black' background; effective lighting to enhance the projected image; correct colour balance; minimum motion blur without a strobing/shuttered look; correct camera height to represent the audience eyeline; effective 'costume' control to suit the talent, content and known benefits to the projected image; realistic interaction with graphics or other elements; make full use of the elements known to 'work' in a Musion presentation.

The methods of producing a suitable image to pre-record or for live TP transmission are fundamentally similar.

Studio

Booking a professional studio with its ancillary facilities and an experienced crew will allow everyone to concentrate on the project and ultimately produce a more satisfactory result.

Certain subjects will have specific requirements—for instance, a car shoot—but most are a variation on a number people standing on a stage. The following assumes a basic scenario of a 4-5 m wide stage.

To create a good black background it is essential to have the maximum distance between the 'stage' and the background black drapes. Around 10 m works well without having to introduce too much negative Master Black control (black crush) via the camera menu settings.

The barrel distortion (exaggerated perspective) of wide angle lenses should be avoided, thus a camera/stage distance of around 10 m needs to be achieved. This allows a 22-25 mm lens (⅔" chip) to cover a 4 m wide action area and the distortion is reduced.

To replicate an average audience eyeline, the camera generally has to be set very low. The result is that, at the above distances, the background needs to be 8.5 m high.

To set the rim lights at the ideal angle, at least 2 m space either side of the stage is needed.

Ideally, therefore, the studio dimensions would be around 20 m(l)×10 m(w)×9 m(h). Black drapes to back wall. Black drapes to floor where seen. Semi-matt (e.g. 'Harlequin' dance floor) or high gloss surface to stage (a stylistic decision).

Sufficient power supply for lighting.

A Steeldeck stage or similar gives the subject a spacial boundary to work within and should match the dimensions of the show stage or the projected area whichever is smaller. The projection limits should be explained to the subject and markers set for him to see, but are not visible to the camera. Although the height of the studio stage need not be the same as the show stage, the difference is an essential figure in calculating the height of the camera. The stage also avoids having to set the camera on the studio floor to achieve the correct height.

As most shoots will involve the recording of sound, a properly sound insulated and acoustically treated studio should be used. Bear in mind that the sound will be reproduced at a high level in the presentation and every extraneous sound will be heard. A professional sound recordist should use high quality microphones to record via a boom or personal/radio mic as appropriate.

Camera Equipment/Settings

Musion live action is currently shot in full High Definition (1920.times.1080). For recorded sequences, HDCam or HDCamSR is used and an HD-SDI signal provided for live transmissions (this is subject to continuing development and updating).

Cameras commonly used are:

Sony HDW-750P (HDW750 for 59.95i)/HDW790P (HDW790 for 59.94i)

Sony HDW-F900/R (all frame rates)

HDC-F950 (all frame rates to HDCamSR)

Interlaced frame rates (50i/59.94i) are used as this produces the most life-like motion.

Progressive scanned images look too 'shuttered' and film-like.

A 1/60th second shutter is used to reduce motion blur without shutter artifacts becoming too noticable. Higher shutter speeds can be tested with slow moving subjects.

Use a small amount of black crush (Master Black to −1 or −2) to bring the black threshold above the video noise level. Turn the monitor brightness up to reveal the noise and the effect of the adjustment. Avoid crushing shadow areas of the subject.

Standard lenses (e.g. Canon HJ21 or 22) are favoured over wide angle zooms. Prime lenses can also be used as long as the camera/stage distance is not compromised by their fixed focal length. The effects of too wide a lens angle include: enlarged hands when gesturing; enlarged head or legs, depending on camera height; the appearance of growing or shrinking with movements towards or away from camera; bowed floor line. At 10 m, a lens of 22-25 mm over a 4 m width substantially reduces distortion.

A high quality Polarising camera filter is used to control specula reflections from either the floor or subject (orientation by experiment).

A full set of tripod legs (tall, baby and HiHat) should be available as the camera height may be very low depending on studio stage height and audience eyeline. As the shot is a lock-off, the head needs to have effective pan and tilt locks.

Monitors

The quality of HD photography, especially for large screen projection, needs to be assessed with a very high degree of accuracy. A hair out of place or a marginal error in lens focus will not be apparent on a 9 inch LCD monitor. The essential parameters of lighting level and balance, focus and fine detail need to observed on at least a 20-inch HD-SDI CRT monitor (ideally Grade 1 or 2). Current LCDs do not have the resolution or contrast range to be a reliable guide to the projected image. The smallest details must be addressed: hair, makeup, clothes, shoes, props as nothing is hidden when projected life-size with a black background.

Lighting

Although it is recommended that the lighting follows the basic proscribed plan, the resulting 'look' should be created by the DoP to reflect the director's ideas and the concept of the project as discussed at the pre-production stage. Certain guidelines should, however, be taken into account.

Slightly exaggerated back/rim light gives the projected image enhanced brightness and sharpness. It also encourages the perception of a 3D image.

A 'rounded' light technique works well. Reducing the front/fill level compared to the side and rim light emphasises the third dimension.

A tightly slotted 'eye light' near to the camera line will lift deep-set eyes without over-filling the body.

Dark and glossy hair can be lifted by adjusting the height and position of the overhead KinoFlo fixtures.

The floor level Fresnel spots can help to fill deep shadows caused by loose fitting clothes or unbuttoned jackets.

If the lighting is too flat, it gives the impression of cardboard cut out figures (distinctly 2D).

Video acquisition does not like highlights—ensure that bright areas maintain detail and do not burn out. Avoid using DCC unless very carefully controlled.

Pay particular attention to the legs and feet of the subject. Make sure both are clearly defined—even to the extent of insisting that the shoes are changed to make them visible.

In certain—mainly music—situations, the design may require additional colour washes. These are most effective as rim and side light using a limited range of distinctive colours. To make a substantial impact, the intensity of the heavily coloured sources must be sufficient to show above the existing rim light. PAR64 battens are an effective, if unsubtle, supplement to the lighting rig.

Eyeline

It is important to understand that the subject is photographed in 2D. As the eyes of a painted subject 'follow you around the room', so the filmed subject looking straight into the camera lens makes eye contact with everyone in the audience. Contributors often have to be coached into not scanning the room as they would in a live situation.

It is essential to get the relative eyeline height correct. If it is wrong, the subject will appear to the key audience members to be leaning backwards or forwards.

A formula allows the camera shooting height to be determined. This takes into account the show stage height, the selected audience eyeline, the studio stage height and the relative distances of the camera and audience.

REFERENCE NUMERAL KEY

FIG. 1

10 Microphone

12 Camera

Figure 2:
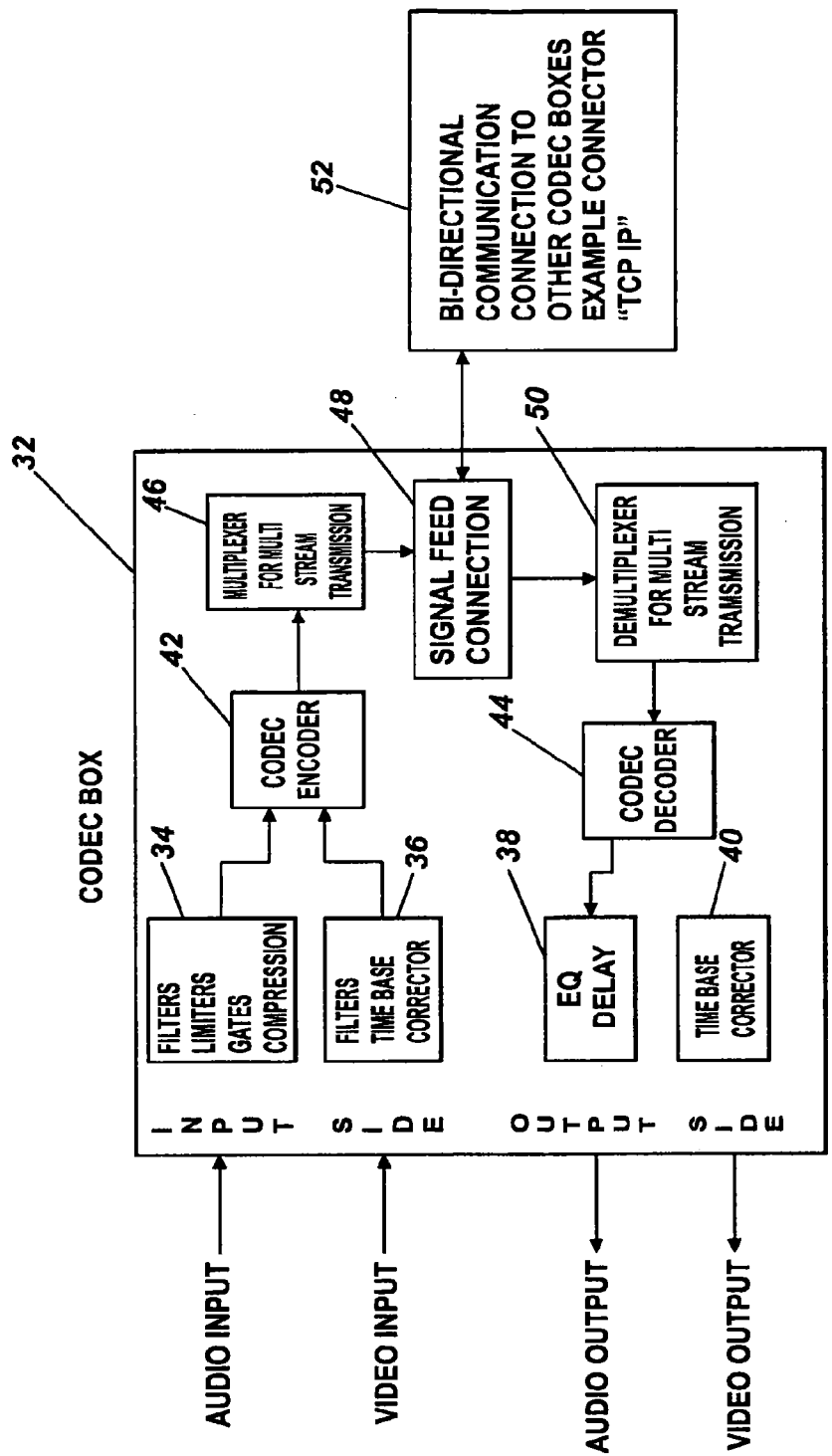
FIG. 2 is a schematic diagram depicting the internal workings of a codec unit of the prior art.
Figure 32:
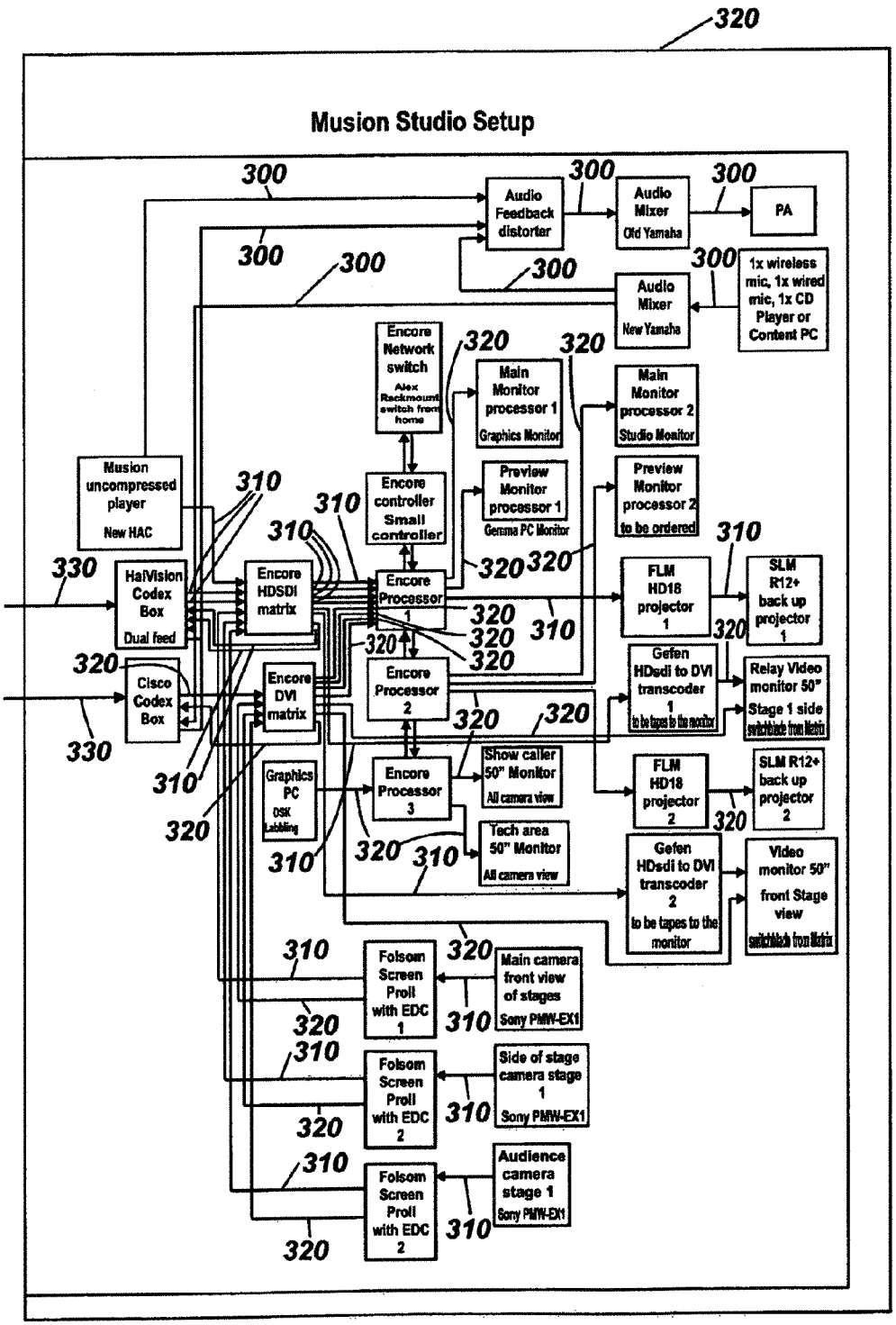
Figure 33:
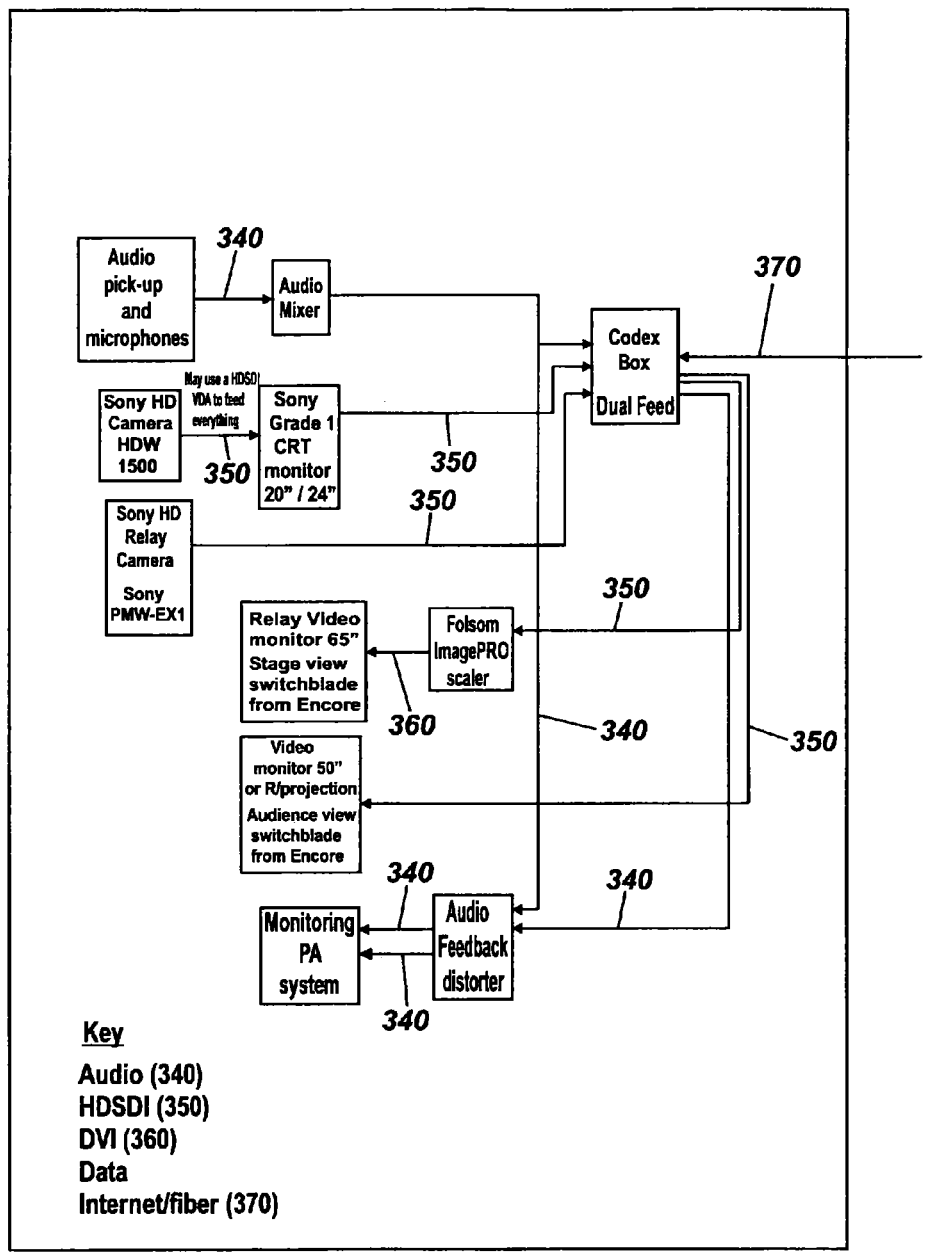
Figure 34:
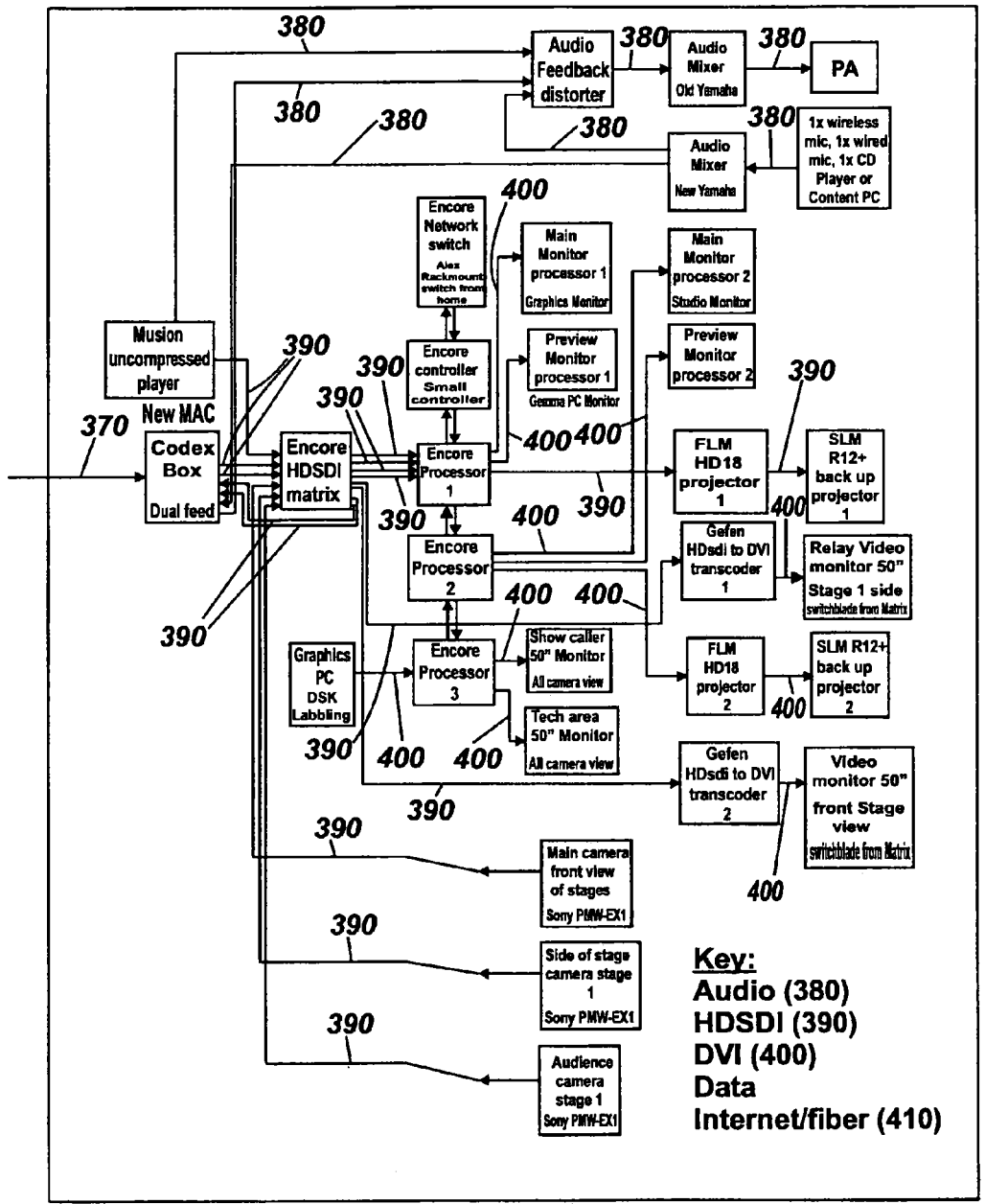
Figure 36:
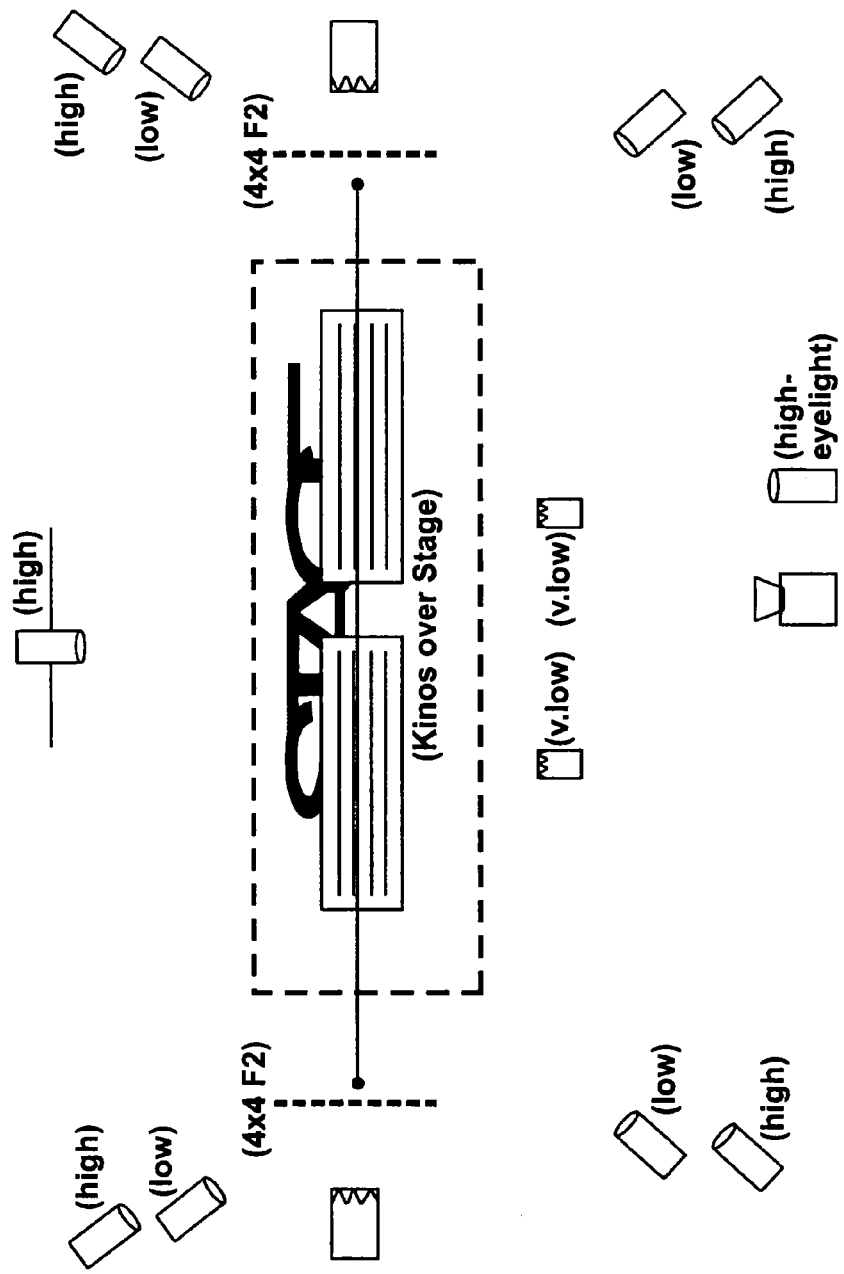
Figure 38:
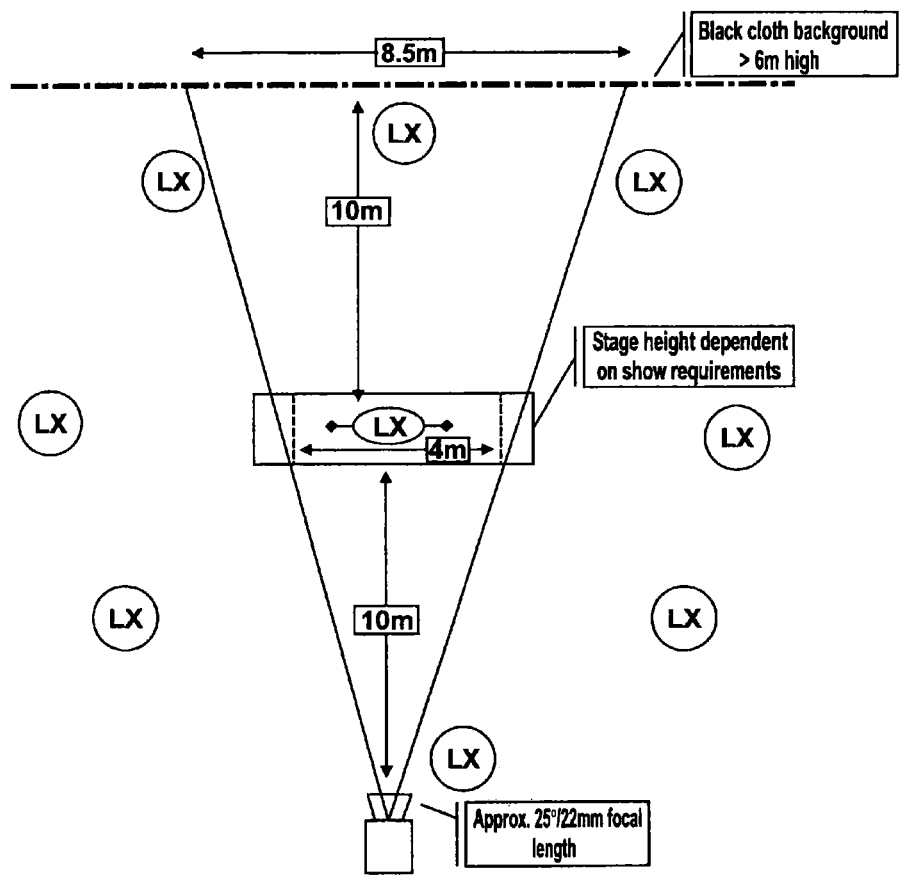

14 Monitor/Display
16 Speaker
18 Codec Box with Audio and Video Inputs and Audio and Video Outputs
20 Transmission over Internet, Satellite, or Radio Waves
22 Codec Box with Audio and Video Inputs and Audio and Video Outputs
24 Microphone
26 Camera
28 Monitor/Display
30 Speaker
FIG. 2
32 Codec Box
34 Filters, Limiters, Gates, Compression
36 Filters, Time-Based Corrector
38 EQ Delay
40 Time-Based Corrector
42 Codec Encoder
44 Codec Decoder
46 Multiplexer for Multistrand Transmission
48 Signal Feed Connection
50 Demultiplexer for Multistrand Transmission
52 Bidirectional Communication Connection to other Codec Boxes (Example Connector: TCPIP)
FIG. 4
54 Silver Drape Line for Chroma Keying
56 Reference Monitor for Displaying Graphic/Documents or using Picture-in-Picture in Projector
58 Optional Camera
60 Person
62 Stage
64 Projector
66 Projection Screen
67 Light emitted by Projector
68 Foil
70 Hologram
72 Black Draping (MATT) to stop flaring camera from foil
74 Monitor (Small Monitor to add Picture-in-Picture next to Film Talent)
76 Stage
78 LED Ring for Cinema Keying
79 Black Drape
80 Camera
FIG. 23
82 Black Drapeline
84 Perceived Hologram
86 Stage
88 Leg
90 Video Wall on its back
92 Musion EyeLiner Foil Tensioned in Frame
94 Front Mask (Top)
96 Rigging Point
98 Front Mask (Bottom)
99 Sightline
100 Person
FIG. 24
102 Stage
104 Person
106 EyeLine
108 EyeLiner Foil
110 Camera Shot Lines
112 Black Material on floor to stop glare/flare of Foil and Camera Lens/Image
114 Heads Up Display
116 Image from Heads Up Display
118 Pepper's Ghost Image from Heads Up Display
120 Camera
FIG. 25
122 Leg
123 Leg
124 Parabolic Mirror
126 Masking
128 Mask
130 Adjustable Arm for moving Display Device up/down, left/right, in/out, to focus image in required position
132 Display Device: Monitor (CRT/LCD/Plasma); Projection (Screen)
134 Perceived Hologram
136 Sightline
138 Mask
140 Person
FIG. 26
142 Person
144 EyeLine
146 Camera Shot Lines
148 Camera
150 Perceived Hologram
152 Projection Screen
154 Mask
156 Foil
158 EyeLine
160 Mask
162 Mask
164 Mirror
166 Projector
168 Person
170 Light from Projector reflected by Mirror
FIG. 27
172 Camera
174 Black Drapes
176 Perceived Hologram
178 Side Monitor
180 Camera
182 Heads Up Display
184 Foil
186 Light from Projector
188 Lights
190 Light from Lights
192 Light from Lights
194 Optional Ambiance Boom Mics
196 Optional Ambiance Boom Mics
198 Lights
200 Light from Lights
202 Side Speakers
204 Mask
205 Optional Mics on Front Mask
206 Mask
208 Seat
210 Optional Mics on Back of Seat
212 Optional Mic on Back of Seat
214 Seat
216 Seat
218 Boom Mic Operator
220 Boom Mic
222 Camera
224 Lights
FIG. 28
226 Black Silver Chroma Keying Drape
228 Light
230 Light from Light
232 Light from Light
234 Light
236 Optional Side Reference Monitor 238 Optional Side Reference Camera
240 Projection Screen
242 Seat
246 Backlight for Talent
248 Stage
250 Person
252 Light from Projector
254 Lights mounted to Frame
256 Lights mounted to Frame
258 Frame with Foil tensioned in it
260 Projector
262 Black Mat Floor Covering
264 Stage
266 Light
268 Optional Extra Keying Light
270 Light from Light
272 Black Drapes
274 Seat
276 Camera
278 Light
280 Blue/Green Lens for Chroma Keying General The aim of a Musion live action shoot is to produce a life-like, high definition video image that best fulfils the technical and aesthetic requirements of the Musion presentation system. It should also capture the most appropriate content for the project. Relevant elements include: a true 'black' background; effective lighting to enhance the projected image; correct colour balance; minimum motion blur without a strobing/shuttered look; correct camera height to represent the audience eyeline; effective 'costume' control to suit the talent, content and known benefits to the projected image; realistic interaction with graphics or other elements; make full use of the elements known to 'work' in a Musion presentation.

The methods of producing a suitable image to pre-record or for live transmission are fundamentally similar.

Studio

Booking a professional studio with its ancillary facilities and an experienced crew will allow everyone to concentrate on the project and ultimately produce a more satisfactory result.

Certain subjects will have specific requirements—for instance, a car shoot—but most are a variation on a number people standing on a stage. The following assumes a basic scenario of a 4-5 m wide stage.

To create a good black background it is essential to have the maximum distance between the 'stage' and the background black drapes. Around 10 m works well without having to introduce too much negative Master Black control (black crush) via the camera menu settings.

The barrel distortion (exaggerated perspective) of wide angle lenses should be avoided, thus a camera/stage distance of around 10 m needs to be achieved. This allows a 22-25 mm lens (⅔" chip) to cover a 4 m wide action area and the distortion is reduced.

To replicate an average audience eyeline, the camera generally has to be set very low. The result is that, at the above distances, the background needs to be 8.5 m high.

To set the rim lights at the ideal angle, at least 2 m space either side of the stage is needed.

Ideally, therefore, the studio dimensions would be around 20 m(l)×10 m(w)×9 m(h). Black drapes to back wall. Black drapes to floor where seen. Semi-matt (e.g. 'Harlequin' dance floor) or high gloss surface to stage (a stylistic decision).

Sufficient power supply for lighting.

A Steeldeck stage or similar gives the subject a spacial boundary to work within and should match the dimensions of the show stage or the projected area whichever is smaller. The projection limits should be explained to the subject and markers set for him to see, but are not visible to the camera. Although the height of the studio stage need not be the same as the show stage, the difference is an essential figure in calculating the height of the camera. The stage also avoids having to set the camera on the studio floor to achieve the correct height.

As most shoots will involve the recording of sound, a properly sound insulated and acoustically treated studio should be used. Bear in mind that the sound will be reproduced at a high level in the presentation and every extraneous sound will be heard. A professional sound recordist should use high quality microphone to record via a boom or personal/radio mic as appropriate.

Camera Equipment/Settings

Musion live action is currently shot in full High Definition (1920×1080). For recorded sequences, HDCam or HDCamSR is used and an HD-SDI signal provided for live transmissions (this is subject to continuing development and updating).

Cameras commonly used are:
Sony HDW-750P (HDW750 for 59.95i)/HDW790P (HDW790 for 59.94i)
Sony HDW-F900/R (all frame rates)
HDC-F950 (all frame rates to HDCamSR)

Interlaced frame rates (50i/59.94i) are used as this produces the most life-like motion. Progressive scanned images look too 'shuttered' and film-like.

A 1/60th second shutter is used to reduce motion blur without shutter artifacts becoming too noticable. Higher shutter speeds can be tested with slow moving subjects.

Use a small amount of black crush (Master Black to −1 or −2) to bring the black threshold above the video noise level (turn the monitor brightness up to reveal the noise and the effect of the adjustment). Avoid crushing shadow areas of the subject.

Standard lenses (e.g. Canon HJ21 or 22) are favoured over wide angle zooms. Prime lenses can also be used as long as the camera/stage distance is not compromised by their fixed focal length. The effects of too wide a lens angle include: enlarged hands when gesturing; enlarged head or legs depending on camera height; the appearance of growing or shrinking with movements towards or away from camera; bowed floor line. At 10 m, a lens of 22-25 mm over a 4 m width substantially reduces distortion.

A high quality Polarising camera filter is used to control specula reflections from either the floor or subject (orientation by experiment).

A full set of tripod legs (tall, baby and HiHat) should be available as the camera height may be very low depending on studio stage height and audience eyeline. As the shot is a lock-off, the head needs to have effective pan and tilt locks.

Monitors

The quality of HD photography, especially for large screen projection, needs to be assessed with a very high degree of accuracy. A hair out of place or a marginal error in lens focus will not be apparent on a 9 inch LCD monitor. The essential parameters of lighting level and balance, focus and fine detail need to observed on at least a 20-inch HD-SDI CRT monitor (ideally Grade 1 or 2). Current LCDs do not have the resolution or contrast range to be a reliable guide to the projected image. The smallest details must be addressed: hair, makeup, clothes, shoes, props as nothing is hidden when projected life-size with a black background.

Lighting

Although it is recommended that the lighting follows the basic proscribed plan, the resulting 'look' should be created by the DoP to reflect the director's ideas and the concept of the project as discussed at the pre-production stage. Certain guidelines should, however, be taken into account.

Slightly exaggerated back/rim light gives the projected image enhanced brightness and sharpness. It also encourages the perception of a 3D image.

A 'rounded' light technique works well. Reducing the front/fill level compared to the side and rim light emphasises the third dimension.

A tightly slotted 'eye light' near to the camera line will lift deep-set eyes without over-filling the body.

Dark and glossy hair can be lifted by adjusting the height and position of the overhead KinoFlo fixtures.

The floor level Fresnel spots can help to fill deep shadows caused by loose fitting clothes or unbuttoned jackets.

If the lighting is too flat, it gives the impression of cardboard cut out figures (distinctly 2D).

Video acquisition does not like highlights—ensure that bright areas maintain detail and do not burn out. Avoid using DCC unless very carefully controlled.

Pay particular attention to the legs and feet of the subject. Make sure both are clearly defined—even to the extent of insisting that the shoes are changed to make them visible.

In certain—mainly music—situations, the design may require additional colour washes. These are most effective as rim and side light using a limited range of distinctive colours. To make a substantial impact, the intensity of the heavily coloured sources must be sufficient to show above the existing rim light. PAR64 battens are an effective, if unsubtle, supplement to the lighting rig.

Eyeline

It is important to understand that the subject is photographed in 2D. As the eyes of a painted subject 'follow you around the room', so the filmed subject looking straight into the camera lens makes eye contact with everyone in the audience. Contributors often have to be coached into not scanning the room as they would in a live situation.

It is essential to get the relative eyeline height correct. If it is wrong, the subject will appear to the key audience members to be leaning backwards or forwards.

A formula allows the camera shooting height to be determined. This takes into account the show stage height, the selected audience eyeline, the studio stage height and the relative distances of the camera and audience.

The invention claimed is:

1. A telepresence method comprising:
providing an image;
using a foil to direct a partially reflected form of the image toward an audience side of the foil;
capturing images of an individual located on an individual side of the foil, which is located opposite the audience side of the foil;
generating a first pepper's ghost image visible from the individual side and invisible from the audience side to provide a heads up display to the individual;
capturing images corresponding to the partially reflected image;
providing the images corresponding to the partially reflected image for viewing by an audience located remotely from the individual; and
wherein, in providing the images corresponding to the partially reflected image for viewing by the audience, the images are provided as a second pepper's ghost image.

2. The telepresence method of claim 1, wherein:
the method further comprises providing a parabolic mirror located remotely from the partially reflected image; and
in providing the images corresponding to the partially reflected image for viewing by the audience, the images are reflected by the parabolic mirror.

3. The telepresence method of claim 2, wherein, in providing the images corresponding to the partially reflected image for viewing by the audience, the images are provided as a second pepper's ghost image.

4. A telepresence method comprising:
providing an image;
using a foil to direct a partially reflected form of the image toward an audience side of the foil;
capturing images of an individual located on an individual side of the foil, which is located opposite the audience side of the foil;
generating a first pepper's ghost image visible from the individual side and invisible from the audience side to provide a heads up display to the individual; and
further comprising arranging the first pepper's ghost image to provide audience feed back to a performer.

5. The telepresence method of claim 4, wherein the first pepper's ghost image is arranged to provide line of sight guidance for the individual that is referentially accurate in terms of eyeline.

6. The telepresence method of claim 1, wherein, in providing the image, an image producing device is oriented so that the image is directed upward.

7. The telepresence method of claim 1, wherein, in using the foil, the foil is an angle of 45 degrees with respect to a screen which is used for displaying the image.

8. A telepresence method comprising:
providing an image;
using a foil to direct a partially reflected form of the image toward an audience side of the foil;
capturing images of an individual located on an individual side of the foil, which is located opposite the audience side of the foil;
generating a first pepper's ghost image visible from the individual side and invisible from the audience side to provide a heads up display to the individual; and
further comprising generating a picture in picture image directed onto the foil.

* * * * *